(12) United States Patent
Kanai et al.

(10) Patent No.: US 6,696,192 B2
(45) Date of Patent: Feb. 24, 2004

(54) FUEL CELL SYSTEM

(75) Inventors: Yasushi Kanai, Wako (JP); Hideo Okamoto, Wako (JP); Kouji Kurosaki, Wako (JP); Tomoki Kobayashi, Wako (JP); Hiroshi Shimanuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 308 days.

(21) Appl. No.: 09/801,312

(22) Filed: Mar. 7, 2001

(65) Prior Publication Data

US 2001/0021468 A1 Sep. 13, 2001

(30) Foreign Application Priority Data

Mar. 8, 2000 (JP) .......................... 2000-064021
Jun. 7, 2000 (JP) .......................... 2000-171173

(51) Int. Cl.$^7$ .......................... H01M 2/00; H01M 2/02; H01M 8/09; H01M 8/12
(52) U.S. Cl. .......................... 429/34; 429/17; 429/22; 429/39
(58) Field of Search .......................... 429/34, 22, 26, 429/24, 38, 39, 17

(56) References Cited

U.S. PATENT DOCUMENTS

| | | | |
|---|---|---|---|
| 5,432,020 A | | 7/1995 | Fleck .......................... 429/13 |
| 5,436,086 A | * | 7/1995 | Seymour et al. .......................... 429/17 |
| 5,441,821 A | * | 8/1995 | Merritt et al. .......................... 429/17 |
| 5,543,238 A | * | 8/1996 | Strasser .......................... 429/17 |
| 6,013,385 A | * | 1/2000 | DuBose .......................... 429/17 |
| 6,106,964 A | | 8/2000 | Voss et al. .......................... 429/20 |
| 6,284,399 B1 | * | 9/2001 | Oko et al. .......................... 429/19 |

* cited by examiner

Primary Examiner—Patrick Ryan
Assistant Examiner—Julian Mercado
(74) Attorney, Agent, or Firm—Lahive & Cockfield, LLP

(57) ABSTRACT

A fuel cell system comprises a humidifier which can humidify a fuel cell even when humidification has become insufficient at start-up of the fuel cell and during normal operation thereof. A water collecting apparatus which collects water in the exhaust gas of the fuel cell, and an auxiliary humidifier which humidifies the gas supply by using collected water from the water collecting apparatus, are provided separate to the water-permeable-type humidifier. The water collecting apparatus comprises a vapor/liquid separator and a collected water storage tank, and the auxiliary humidifier comprises a check valve, a collected water supply pump, an auxiliary humidification pipe, and an injector. The collected water in the collected water storage tank is transferred by a collected water supply pump, atomized by the injector, and supplied to the intake side of the fuel cell.

22 Claims, 22 Drawing Sheets

← COLLECTED WATER
←------ AUXILIARY HUMIDIFYING WATER
← GAS (AIR)

← COLLECTED WATER
← GAS (AIR)

← COLLECTED WATER
←----- AUXILIARY HUMIDIFYING WATER
← GAS (AIR)

← COLLECTED WATER
←------- AUXILIARY HUMIDIFYING WATER
← GAS (FUEL)

← COLLECTED WATER
← GAS (FUEL)

← COLLECTED WATER
←----- AUXILIARY HUMIDIFYING WATER
← GAS (AIR)

← COLLECTED WATER
←----- AUXILIARY HUMIDIFYING WATER
← GAS (AIR)

FUEL CELL SYSTEM

BACKGROUND OF THE INVENTION

1. Field of the Invention

The present invention relates to a fuel cell system comprising a water-permeable-type humidifier. For example, this invention relates to the fuel cell system comprising a humidifier which collects water contained in exhaust gas from a fuel cell, which generates power by the chemical reaction of hydrogen and oxygen, and humidifies the gas supplied to a fuel cell. More particularly, this invention relates to technology which is effective in humidifying a fuel cell at start-up and during the operation thereof.

2. Description of the Related Art

For example, in a fuel cell which uses a solid high polymer membrane as an electrolyte membrane, the solid high polymer membrane must be kept saturated by water in order to obtain the functions of a proton-(hydrogen ion-) conductive electrolyte. In view of this, a water-permeable-type humidifier is provided for collecting water in exhaust gas (off gas) from the fuel cell, and using the collected water to humidify supply gas (hydrogen gas and oxygen gas) which is supplied to the fuel cell.

One type of this water-permeable-type humidifier is a hollow fiber membrane water collecting apparatus comprising a hollow fiber membrane which allows water to permeate parallel to the thickness of the membrane, as for example disclosed in Japanese Unexamined Patent Applications, First Publications Nos. Hei 7-71795 and Hei 8-273687.

In the hollow fiber membrane water collecting apparatus, water is collected from one (high humidity side) of the fluids flowing in and out of the hollow fiber membrane, and the other fluid (low humidity side) is humidified by transferring the collected water through the hollow fiber membrane to the other fluid.

FIG. 28 shows a general fuel cell. As shown in FIG. 28, a fuel cell 201 comprises a cathode (air electrode) and an anode (fuel electrode) on either side of an electrolyte membrane comprising a solid high polymer membrane 201c. A cathode electrode 201 and an anode electrode 201d comprise catalysts, and are provided respectively to the two sides. The solid high polymer membrane 201c for example comprises a proton exchange membrane of perfluorocarbonsulfonic acid membrane, and functions as a proton-conductive electrolyte when saturated by water. At room temperature there is a low specific resistance of 20 $\Omega$-proton or less. The catalyst in the cathode electrode 201b creates oxygen ions from oxygen, and the catalyst in the anode electrode 201d creates protons from hydrogen. A cathode side gas passage 201a is provided in the outer side of the cathode electrode 201b, and allows an air supply As of oxidizing gas to flow through. An anode side gas passage 201e is provided in the outer side of the anode electrode 201d, and allows a hydrogen supply Hs of fuel gas to flow through. When the air supply As flows along the cathode side gas passage 201a and the hydrogen supply Hs flows along the anode side gas passage 201e, the effect of the catalyst of the anode electrode 201d ionizes the hydrogen, creating protons. The protons move through an electrolyte membrane comprising the solid high polymer membrane 201c, and reach the cathode electrode 201b. The protons react with the oxygen ions, created from the oxygen of the air supply As by the effect of the catalyst, and thereby create water. The air supply As containing the created water and unused oxygen is exhausted as exhaust air Ae from the cathode side gas passage 201a of the fuel cell 201. On the anode electrode 201d, electrons are created when ionizing the hydrogen. These electrons pass through an external load, such as a motor M or the like, and reach the cathode electrode 201b.

In the fuel cell system comprising the hollow fiber membrane collecting apparatus, the water which is created when the fuel cell is operated, and exhausted therefrom, is collected via the hollow fiber membrane and used as water for humidifying the fuel cell. In cases where the fuel cell system is switched off for a long period of time and the like, the hollow fiber membrane becomes dry, making it impossible to humidify the fuel cell and to start generating power when the fuel cell is started up.

Not only immediately after start-up but also during normal operation (power-generation) of the fuel cell, there are cases where the amount of humidification obtained by the water-permeable-type humidifier is insufficient, depending on the operational status of the fuel cell (e.g. the humidifying capability of the water-permeable-type humidifier and the changes in the amount of humidification required by the fuel cell). In the abovementioned fuel cell system, the water-permeable-type humidifier collects water from the exhaust air and humidifies the air supply by using the collected water. However, in view of the fact that the evaporation rate of water is inversely proportional to pressure at constant temperature, the amount of water required per fixed volume (capacity) changes when the pressure is changed, even when the predetermined dew-point of the air supply to the fuel cell remains the same. As a consequence, the amount of water acquired from the exhaust air of the fuel cell may not be sufficient for humidification.

By way of example, let us compare (a) a high-pressure operating system which comprises a pump upstream in the cathode side gas passage and shifts the air by positive pressure, and (b) a low-pressure operating system which comprises a pump downstream in the cathode side gas passage and shifts the air by negative pressure. The low-pressure operating system of (b) has less pressure loss than the high-pressure operating system of (a), and superior driving force, but has a drawback that it requires a far greater amount of water per constant volume (capacity). For this reason, the humidification amount of the polymer membrane may be insufficient when using only water acquired from exhaust air, particularly in negative pressure operations, and insufficient humidification of the supply gas may lead to poor power generation while the fuel cell is operating. The degree of humidification insufficiency is noticeable greater than in the case of positive pressure operations.

One conceivable solution would be to increase the scale of the water-permeable-type humidifier, but the inevitable increase in pressure loss makes this impractical.

SUMMARY OF THE INVENTION

The present invention has been achieved in order to solve the above problems. It is an object of this invention to provide a fuel cell system which can effectively humidify a fuel cell without excess or insufficiency, both at start-up and during operation of the fuel cell. It is another object of this invention to realize the fuel cell system which can effectively humidify a fuel cell without excess or insufficiency, not only when operating at positive pressure but also when operating at negative pressure, where the humidification is especially likely to become insufficient, and can utilize the economical features of negative-pressure operation.

In order to achieve the above objects, the fuel cell system of this invention comprises a fuel cell (1,101) which generates power by using a supply of fuel gas and oxidizing gas; a water-permeable-type humidifier (a hollow fiber membrane water collecting apparatus 2, a water-permeable-type humidifier 123) which collects water from exhaust gas exhausted from the fuel cell, and humidifies the gas supply to the fuel cell; and an auxiliary humidifier which is provided with a vapor/liquid separator (3, a condenser 126) which separates the water from the exhaust gas, a collected water storage tank (4, a reservoir section of a condenser 126) which stores the separated collected water (9), and an injector (17,126*b*) which injects the collected water, stored in the collected water storage tank, to the gas supply or the exhaust gas.

Furthermore, this invention provides a fuel cell system comprises a fuel cell (1,101) which generates power by using a supply of fuel gas and oxidizing gas; a water-permeable-type humidifier (a hollow fiber membrane water collecting apparatus 2, and a water-permeable-type humidifier 123) which collects water from exhaust gas exhausted from the fuel cell, and humidifies the gas supply to the fuel cell; and an auxiliary humidifier which collects water that could not be collected by the water-permeable-type humidifier, and humidifies the gas supply to the fuel cell. The auxiliary humidifier is provided with a vapor/liquid separator (3, a condenser 126) which separates the water from the exhaust gas, a collected water storage tank (4, a reservoir section of a condenser 126) which stores the separated collected water (9), and an injector (17,126*b*) which injects the collected water, stored in the collected water storage tank, to the gas supply or the exhaust gas.

According to these constitutions, water in the exhaust gas which is exhausted from the fuel cell is separated by the vapor/liquid separator, and stored in the collected water storage tank. Then, the auxiliary humidifier uses the collected water in the collected water storage tank to humidify the gas supply to the fuel cell. Consequently, in the case where the gas supply to the fuel cell cannot be humidified by the water-permeable-type humidifier at start-up of the fuel cell, and where the amount of humidification becomes insufficient during normal operation of the fuel cell, the gas supply can be humidified by means of the auxiliary humidifier, which is provided separate from the water-permeable-type humidifier.

In this invention, the auxiliary humidifier may supply the collected water to the fuel cell when the amount of humidification obtained by the water-permeable-type humidifier is insufficient for humidifying the fuel cell (S204). According to this constitution, when the required humidification conditions can be satisfied by the water-permeable-type humidifier alone, the auxiliary humidifier need not be used. This makes it possible to reduce wasteful consumption of power.

Furthermore, in this invention, the auxiliary humidifier may supply the collected water for a predetermined period of time at the start-up (S4) of the fuel cell. According to this constitution, after the water-permeable-type humidifier has become capable of humidification, the system switches from humidification by the auxiliary humidifier to humidification by the water-permeable-type humidifier alone. This makes it possible to reduce wasteful consumption of power.

Furthermore, in this invention, the auxiliary humidifier may supply the collected water based on the difference between the amount of humidification required by the fuel cell and the amount of humidification which can be achieved by the water-permeable-type humidifier. According to this constitution, the amount of water needed by the fuel cell in order to generate power with stability can be added to the gas supply. Moreover, power can be generated with stability.

In this invention, the auxiliary humidifier is provided with a water level detector (10) which detects the water level of collected water stored in the collected water storage tank, and exhausts the collected water from the collected water storage tank when the water level exceeds a predetermined water level. According to this constitution, excess water is automatically exhausted, instead of being left in the system.

Furthermore, in this invention, the auxiliary humidifier may further comprise an anti-freezing apparatus (electrical heater, a water temperature gauge, an auxiliary humidification pipe 13, a humidifying water auxiliary tank 18, a humidifying water auxiliary valve 20, a three way valve 21, and a humidification water circulating pipe for preventing freezing 22) which prevents the collected water from freezing. According to this constitution, the gas supply can be humidified without freezing the collected water, even when the outside air temperature is low.

Furthermore, in this invention, the water-permeable-type humidifier may be provided at least on an air electrode side of the fuel cell, and the auxiliary humidifier collects part of the water created on the air electrode side which could not be collected by the water-permeable-type humidifier, and humidifies the gas supply to a fuel electrode of the fuel cell. According to this constitution, even in the case where humidification on the fuel electrode side becomes insufficient while the fuel cell is operating, the insufficient humidification on the fuel electrode side can be supplemented by using the water which was collected on the air electrode side of the fuel cell.

Incidentally, in this invention, the predetermined period of time may be set to any of a predetermined time from the start-up of the fuel cell, the time until the generated voltage of the fuel cell exceeds a predetermined value, the time until the amount of humidification exceeds a predetermined value, and the time until the dew point of the gas supply exceeds a predetermined value. According to this constitution, the required amount of humidification can be obtained.

In this invention, the auxiliary humidifier may supply water upstream from the water-permeable-type humidifier, or to the gas supply side of the fuel cell. According to the constitution wherein the auxiliary humidifier supplies water to the gas supply side of the water-permeable-type humidifier, the water-permeable-type humidifier is able to humidify the gas supply in the same manner as during normal operation. On the other hand, according to the constitution wherein the auxiliary humidifier supplies water to the gas supply side of the fuel cell, it becomes possible to bypass the water-permeable-type humidifier and directly humidify the gas supply by using the auxiliary humidifier.

Furthermore, in this invention, the auxiliary humidifier may stop the auxiliary humidification when the water level detected by the water level detector is below a predetermined water level. According to this constitution, when the water level of the collected water stored in the collected water storage tank has fallen below the predetermined level, i.e. when there is insufficient collected water for the auxiliary humidifier to carry out humidification, the operation of the auxiliary humidifier is stopped, thereby making it possible to eliminate wasteful consumption of power.

Furthermore, in this invention, the anti-freezing apparatus may be set to operate when the temperature of the collected water falls below a predetermined temperature (e.g. below 3° C.). According to this constitution, the anti-freezing apparatus does not operate when the water is not in danger of freezing. Therefore, wasteful consumption of power can be eliminated.

Furthermore, in this invention, an exhaust gas transfer apparatus may be provided downstream from the fuel cell. According to this constitution, the side upstream from the exhaust gas transfer apparatus has low pressure, and the side downstream from the exhaust gas transfer apparatus has high pressure. Consequently, the amount of water required for stable power-generation of the fuel cell is added to the gas supply, and power is generated with stability. Furthermore, since the system operates at low pressure with low pressure loss, the energy efficiency and economic efficiency are increased.

Furthermore, in this invention, the pressure control apparatus (125) which controls the pressure of the exhaust gas may be provided downstream from the vapor/liquid separator. While the fuel cell is operating, the exhaust gas transfer apparatus increases the pressure on the downstream side (exhaust side) of the exhaust gas transfer apparatus to more than the pressure on the upstream side (suction side), and the water obtained by the vapor/liquid separator is naturally supplied. However, cases may be envisaged where the pressure on the side (exhaust side) which is downstream from the exhaust gas transfer apparatus is lower than the pressure which the auxiliary humidifier operates at, or lower than a pressure which obtains sufficient rapid responsiveness. According to the constitution described above, the reliability and responsiveness of the auxiliary humidifier can be increased.

DETAILED DESCRIPTION OF THE PREFERRED EMBODIMENTS

Preferred embodiments of the present invention will be explained with reference to the drawings.

Embodiment 1

Figure 1:
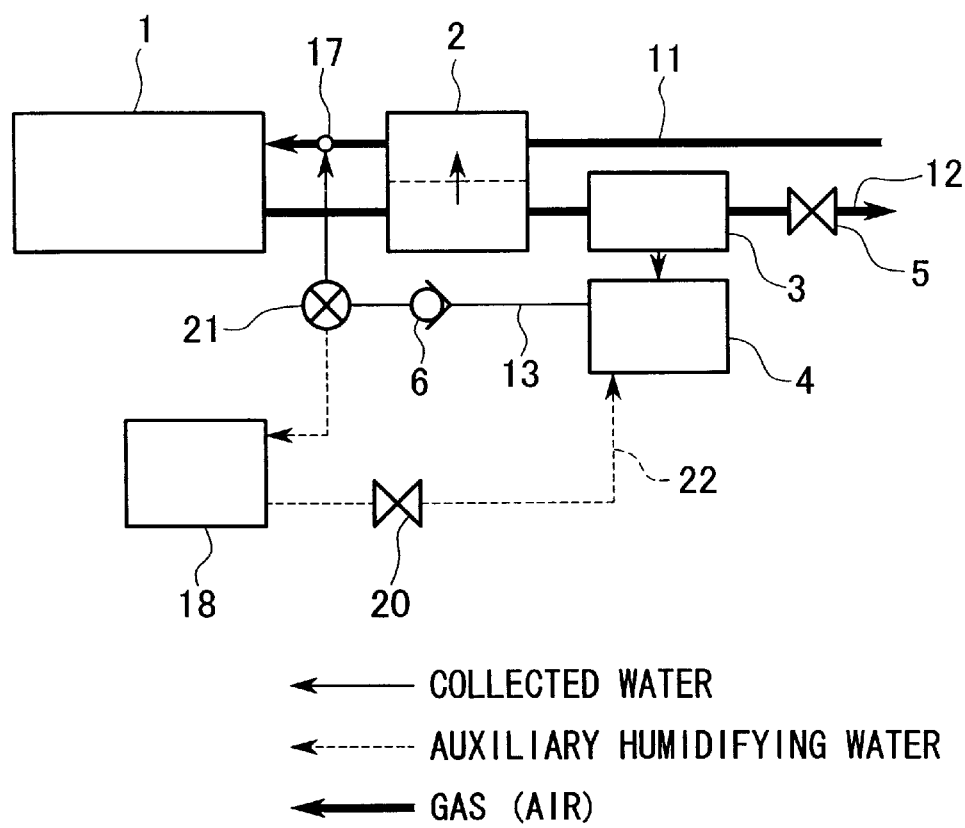
FIG. 1 is a diagram showing the constitution of primary parts of a fuel cell system comprising a humidifier according to a first embodiment of the present invention.
Figure 2:
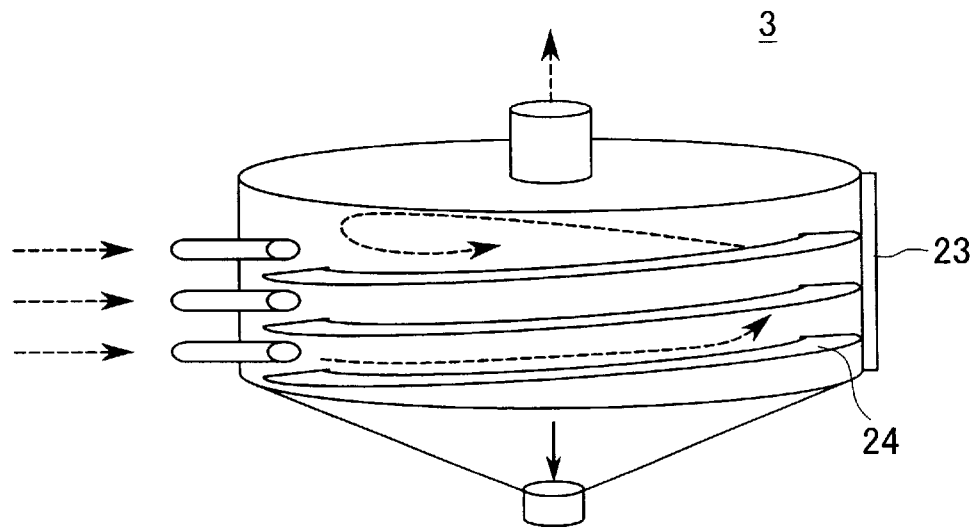
FIG. 2 is a cross-sectional view of the constitution of a vapor/liquid separator.
Figure 3:
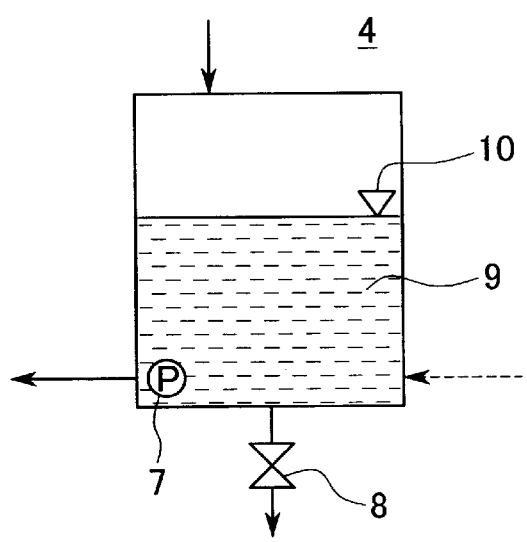
FIG. 3 is a cross-sectional view of the constitution of a collected water storage tank.

FIG. 1 is a diagram showing the constitution of primary parts of a fuel cell system comprising a humidifier according to a first embodiment of this invention, FIG. 2 is a cross-sectional view of the constitution of an vapor/liquid separator shown in FIG. 1, and FIG. 3 is a cross-sectional view of the constitution of a collected water storage tank shown in FIG. 1. In FIG. 1, reference numeral 1 represents a fuel cell.

An intake pipe 11 which transfers supply gas (air sucked in from the outside) for the fuel cell 1 to the fuel cell 1, and an exhaust pipe 12 which transfers and exhausts exhaust gas (off gas) from the fuel cell 1, are connected to the air electrode of the fuel cell 1.

A hollow fiber membrane water collecting apparatus (water-permeable-type humidifier) 2 uses a water condensation membrane or an ion-hydration-type membrane to collect water from the exhaust gas exhausted from the fuel cell 1. The hollow fiber membrane water collecting apparatus 2 and an injector 17 are provided along the intake pipe 11. The hollow fiber membrane water collecting apparatus 2, a vapor/liquid separator 3, and an air electrode back pressure adjusting valve 5 are provided along the exhaust pipe 12.

An auxiliary humidification pipe 13 splits from the vapor/liquid separator 3, and connects via a collected water storage tank 4, a check valve 6, and a three way valve 21, to the injector 17.

A humidification water circulating pipe for preventing freezing 22 splits from the three way valve 21, and connects via a humidifying water auxiliary tank 18 and a humidifying water auxiliary valve 20 to the collected water storage tank 4.

To improve heat retaining property, the collected water storage tank 4, the humidifying water auxiliary tank 18, and the auxiliary humidification pipe 13 comprise heat-tolerance resin and the like.

As shown in FIG. 2, the inside of the vapor/liquid separator 3 comprises a cylinder in order to reduce pressure loss as much as possible. A material such as stainless steel is used in view of its characteristics of tolerance against corrosion and thermal radiation.

A helical straightening vane 24 is provided inside the vapor/liquid separator 3. Water vapor in the exhaust gas from the fuel cell 1 easily condenses when it contacts the wall faces of the straightening vane 24 and the main body of the vapor/liquid separator 3.

The condensation effect is further increased by a cooling fin 23 which is provided around the vapor/liquid separator 3.

Figure 22:
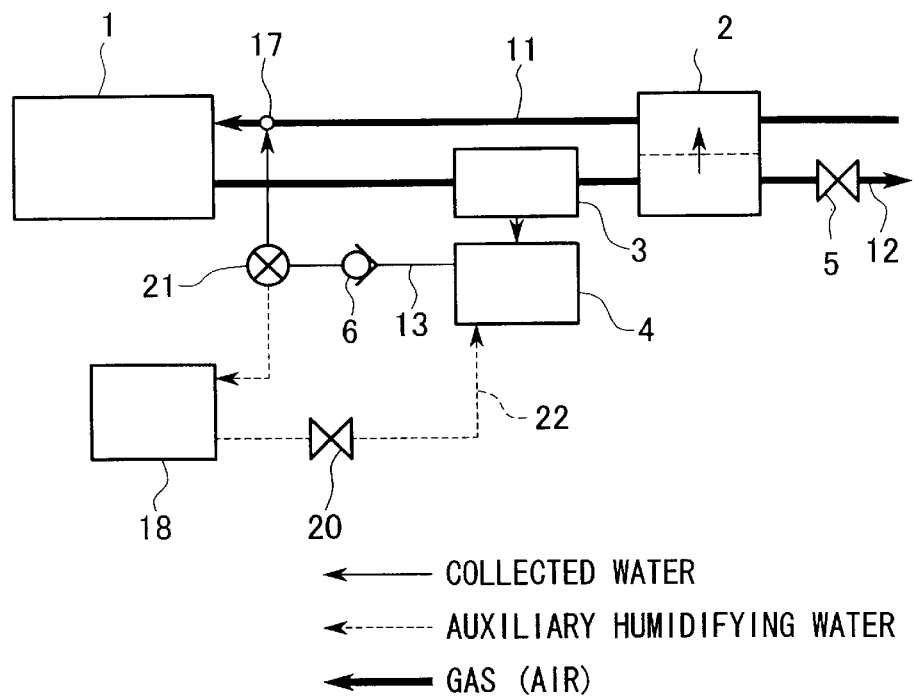
FIG. 22 is a diagram showing the system constitution of a sixth embodiment.
Figure 23:
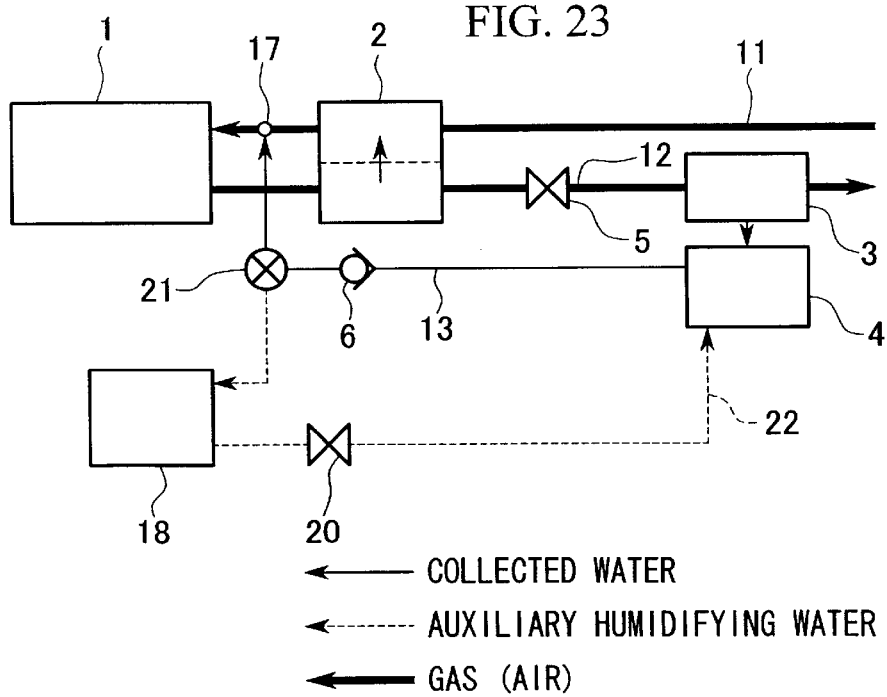
FIG. 23 is a diagram showing the system constitution of a seventh embodiment.

The hollow fiber membrane water collecting apparatus 2 and the vapor/liquid separator 3 may be integrated, thereby reducing the pressure loss at the exhaust pipe 12 which extends across them. In addition, the condensed water in the exhaust pipe 12 may be directed to the vapor/liquid separator 3. Furthermore, the installation position of the vapor/liquid separator 3 is not restricted to that shown in FIG. 1, and may installed in the positions described later in a sixth embodiment (FIG. 22) and a seventh embodiment (FIG. 23).

Subsequently, an outline of the operation of the humidifier according to this embodiment will be explained.

While the fuel cell is operating, the air electrode of the fuel cell 1 exhausts exhaust gas. The water content of this exhaust gas is partially collected in the hollow fiber membrane water collecting apparatus 2, provided across the intake pipe 11 and the exhaust pipe 12. Thereafter, the uncollected water content is partially collected at the vapor/liquid separator 3, provided further to the exhaust side than the hollow fiber membrane water collecting apparatus 2.

The collected water 9 which has been condensed by the vapor/liquid separator 3 is fed to the collected water storage tank 4.

The collected water supply pump 7 shown in FIG. 3 is provided inside the collected water storage tank 4. At start-up of the fuel cell, the collected water supply pump 7 is operated for a predetermined period of time, or until the generated voltage is equal to or exceeds a predetermined level, or until the amount of humidification is equal to or exceeds a predetermined level, or until the dew point of the gas supplied to the fuel cell 1 is equal to or exceeds a predetermined level, thereby supplementing the humidification of the fuel cell 1.

A collected water amount detector 10, such as a level sensor or a level switch, detects the amount of collected water in the collected water storage tank 4.

When the level of the collected water 9 has exceeded an upper limit, a drain valve 8 is opened and the collected water 9 is exhausted to the outside or to the humidifying water auxiliary tank 18 until the water level drops to a predetermined level.

Conversely, when the level of the collected water 9 has dropped below a set value, it is restored to the predetermined level by replenishing with water from the humidifying water auxiliary tank 18.

Water temperature gauges (not shown in the diagrams) are provided inside the collected water storage tank 4 and the humidifying water auxiliary tank 18. When the water temperature has dropped below a predetermined temperature (e.g. 3° C.), the three way valve 21 is opened from the collected water storage tank 4 to the humidifying water auxiliary tank 18 side and the collected water supply pump 7 is intermittently operated, whereby the collected water 9 is fed back between the collected water storage tank 4 and the humidifying water auxiliary tank 18, preventing the collected water 9 from freezing.

The collected water 9 in the collected water storage tank 4 is fed through a check valve 6, which prevents gas back flow, and is atomized in the injector 17. The atomized water passes along the intake pipe 11 and is supplied to the air electrode of the fuel cell 1.

This makes it possible to humidify the fuel cell at start-up, and when the hollow fiber membrane water collecting apparatus 2 is unable to humidify the fuel cell 1 because the hollow fiber membrane has dried. Consequently, the time until the fuel cell starts to generate power can be shortened.

As described above, in this embodiment, the collected water supply pump 7, the auxiliary humidification pipe 13, the check valve 6, and the injector 17, comprise an auxiliary humidifier. Water temperature gauges (not shown in the diagrams), the humidifying water auxiliary tank 18, the humidifying water auxiliary valve 20, and the three way valve 21, comprise a freezing prevention apparatus.

Subsequently, the control flow of the humidifier according to this embodiment will be explained by using a flowchart.

Figure 4:
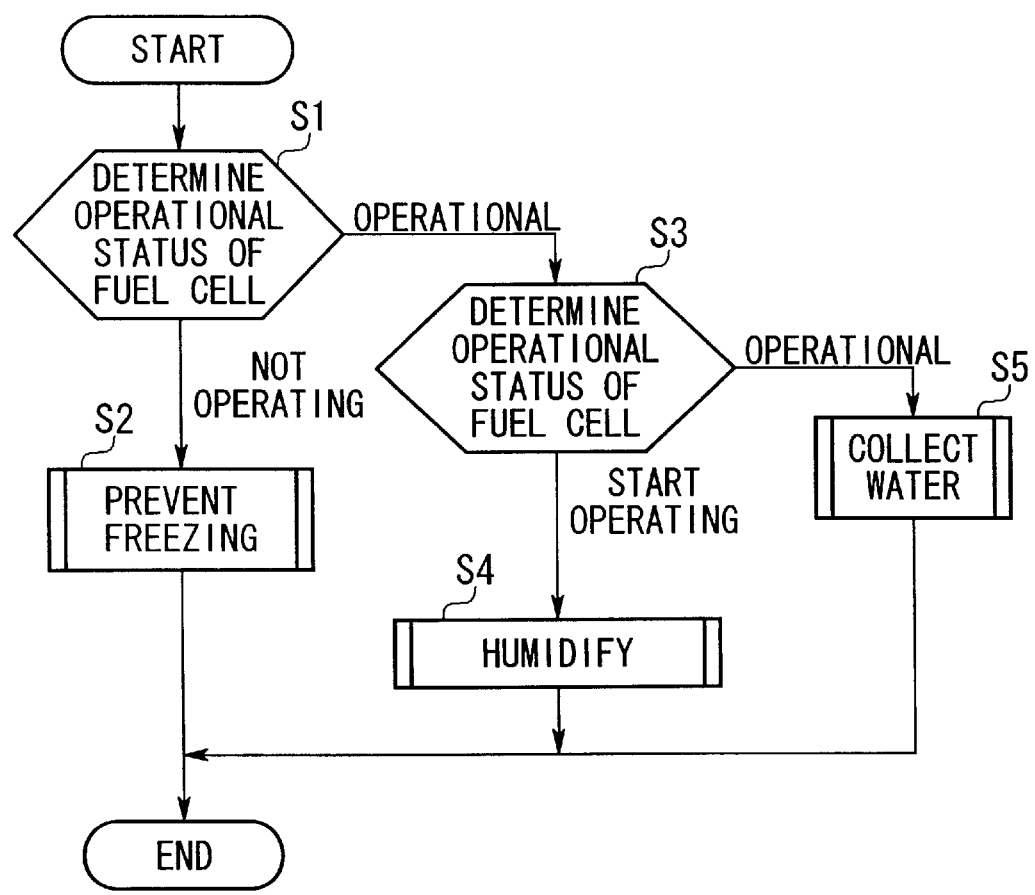
FIG. 4 is a flowchart showing a main routine of the control flow of the humidifier according to the first embodiment.

FIG. 4 shows a main routine, executed by an ECU (not shown in the diagrams) which is activated by using an ignition key, and is also activated at predetermined intervals during operation.

Firstly, the operational status of the fuel cell 1 is determined in step S1.

Figure 14:
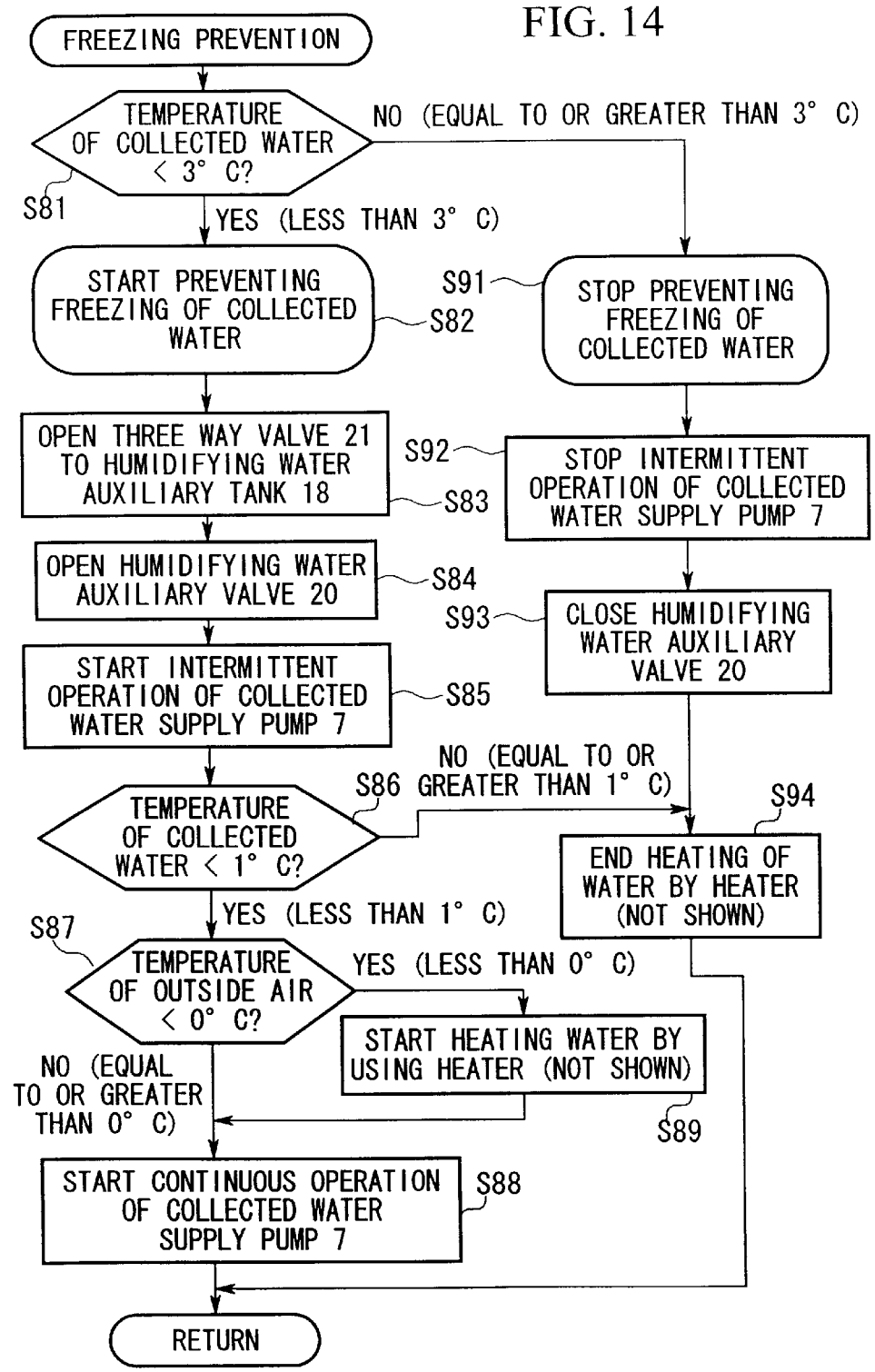
FIG. 14 is a flowchart showing a subroutine for preventing freezing.

More specifically, the ECU determines whether the fuel cell 1 is operating or not. When not operational, the flow proceeds to step S2 and executes the subroutine for preventing freezing (FIG. 14).

On the other hand, when the fuel cell 1 is operational, the flow proceeds to step S3 and determines the operational status of the fuel cell 1 in greater detail.

More specifically, it is determined whether the fuel cell 1 is at operation start-up or already operating. When at start-up, the subroutine for humidification (FIG. 5) of step S4 is executed.

On the other hand, when the fuel cell 1 is already operational, the subroutine for collecting water (FIG. 11) of step S5 is executed.

Subsequently, the subroutine for humidification (step S4 of FIG. 4) will be explained.

In this subroutine, at power generation start-up, the water which was collected in the collected water storage tank 4 during the previous operation of the fuel cell, and water which has been refilled from the humidifying water auxiliary tank 18, are atomized by using the injector 17. The fuel cell 1 is humidified by injecting the atomized water to the gas supply side of the fuel cell 1.

When the amount of collected water, detected by the collected water amount detector 10 provided inside the collected water storage tank 4, is less than the lower limit, the humidifying water auxiliary valve 20 is opened and water for auxiliary humidification is fed as appropriate from the humidifying water auxiliary tank 18 to the collected water storage tank 4. (This process is not shown in FIG. 5.)

Firstly, the amount of water in the collected water storage tank 4 is determined in step S11.

Specifically, it is determined whether or not there is sufficient stored water in the collected water storage tank 4 based on the amount of water detected by the collected water amount detector 10. When there is sufficient stored water, the ECU executes the subroutine for humidifying operation of step S12 (FIG. 6) and thereafter returns to the main routine of FIG. 4.

On the other hand, when there is insufficient stored water, the flow proceeds to step S13 and determines the amount of stored water in greater detail.

Specifically, it is determined whether the detected amount of water is equal to or below a predetermined value which requires a warning (warning level) or is equal to or below an even lower predetermined value at which the fuel cell 1 cannot be humidified (alarm level).

When the amount of stored water is at the warning level, the operator of the fuel cell is notified of this fact by means of a warning light or a warning sound in step S14.

Then, proceeding to step S12, the ECU executes the subroutine for humidifying operation (FIG. 6) and thereafter returns to the main routine of FIG. 4.

On the other hand, when the amount of stored water is at the alarm level, the operator of the fuel cell is notified of this fact by means of an alarm light or an alarm sound in step S15, and the activation of the fuel cell 1 and the humidifying operation thereof are stopped (steps S16 and S17). Thereafter, the ECU returns to the main routine of FIG. 4.

Incidentally, the amount of water detected by the collected water amount detector 10 may be displayed constantly to the fuel cell operator by using a display apparatus or the like. Similarly, the amount of water in the humidifying water auxiliary tank 18 may also be constantly displayed.

Subsequently, the subroutine for humidifying operation (step S12 of FIG. 5) will be explained based on FIG. 6.

This is a subroutine for humidifying the fuel cell by using water collected by the collected water storage tank 4 during the previous operation of the fuel cell, or water refilled to the collected water storage tank 4 from the humidifying water auxiliary tank 18.

Figure 6:
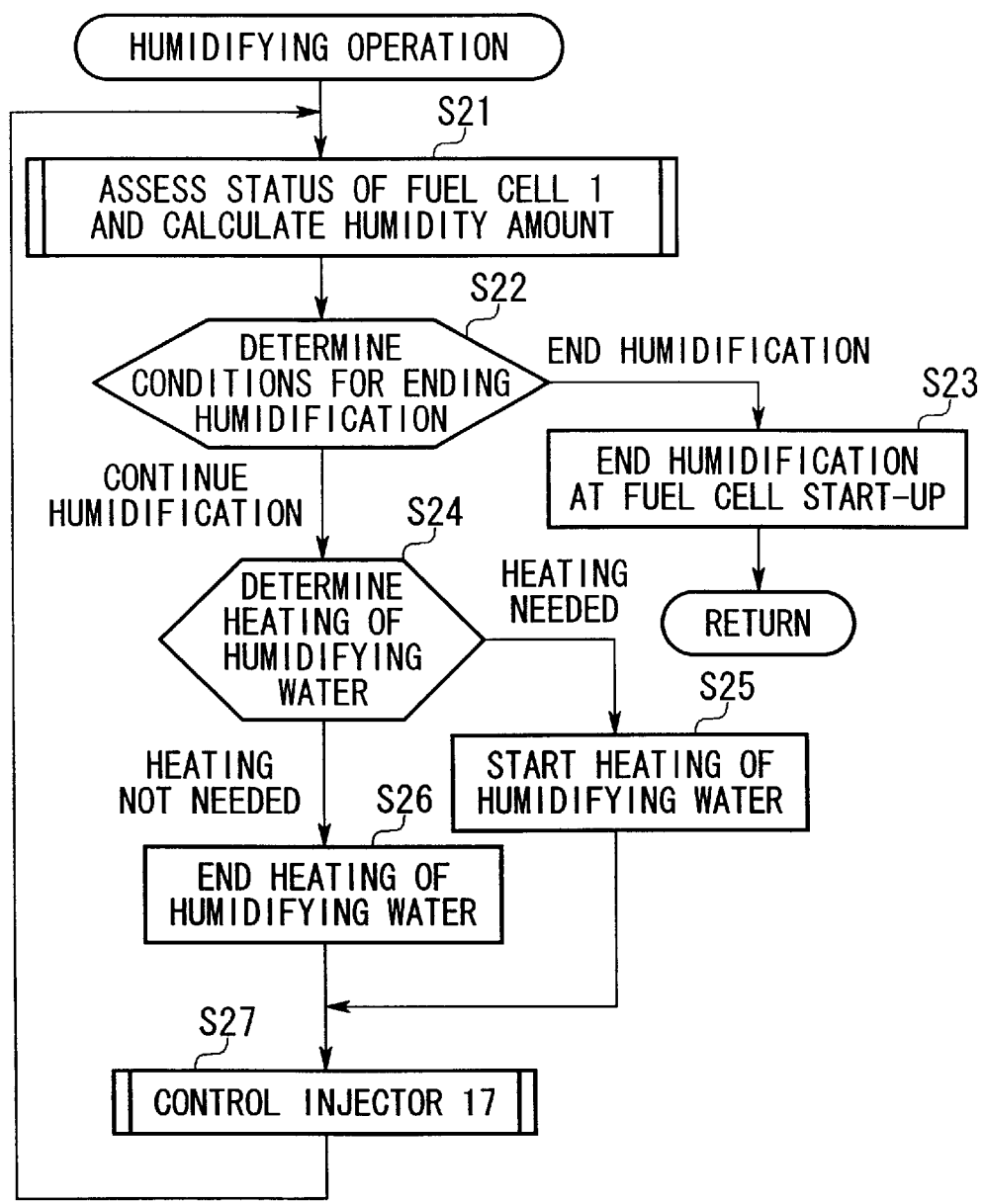
FIG. 6 is a flowchart showing a humidification operation subroutine.

Firstly, in step S21, the status of the fuel cell 1 is assessed and the amount of humidification is calculated (FIG. 6).

Subsequently, in step S22, the conditions for terminating humidification are determined.

Humidification is terminated when any of the voltage generated by the fuel cell 1, the dew point of the gas supply to the fuel cell 1, and the amount of humidification, reach a predetermined value.

Figure 5:
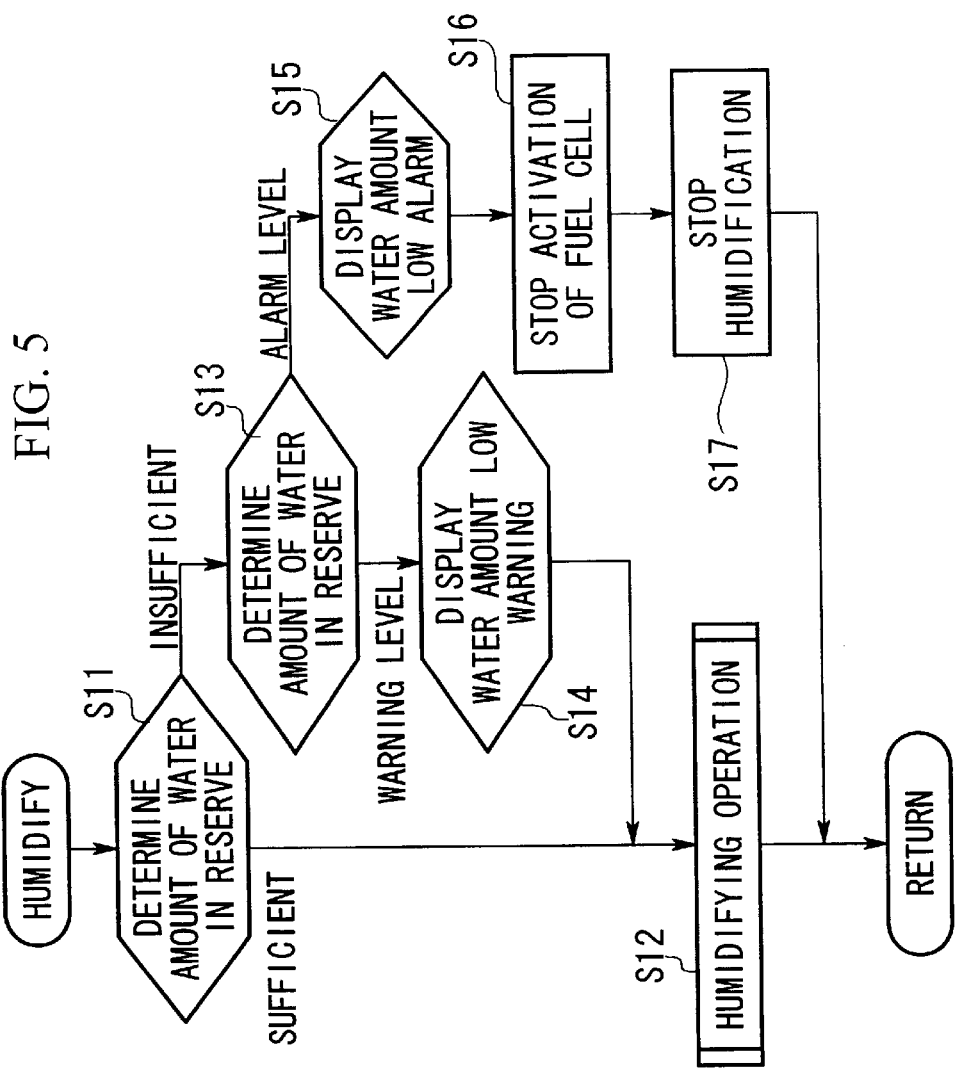
FIG. 5 is a flowchart showing a humidification subroutine.

When it has been determined that humidification should be terminated, the flow proceeds to step S23, in which humidifying operation at start-up of the fuel cell is terminated, and then returns to the subroutine of FIG. 5.

On the other hand, when it has been determined that humidification should continue, the flow proceeds to step S24, in which heating of the humidifying water is determined. More specifically, heating is deemed to be necessary when the temperature of the gas supply to the fuel cell 1 is equal to or below a predetermined temperature (e.g. 3° C.) and unnecessary when above the predetermined temperature.

When it has been determined that heating is necessary in step S24, the flow proceeds to step S25 in which an electrical heater (not shown) starts heating the humidifying water.

On the other hand, when it has been determined that heating is unnecessary, the flow proceeds to step S26 in which heating of the humidifying water ends.

Following steps S25 and S26, the flow proceeds to step S27, in which the operation of the injector 17 is controlled (FIG. 10), and then returns again to step S21.

In this subroutine, the operation of the injector 17 and the amount of the gas supply are controlled based on the temperature of the gas supply to the fuel cell 1, the temperatures of the fuel cell 1 or the fuel cell cooling water, and the dew point of the gas supply to the fuel cell 1.

Therefore, the water for humidifying which is atomized by the injector 17 does not condense in great quantities inside the fuel cell 1.

Incidentally, the water for humidifying can be injected from the injector 17 by setting the number of rotations of the collected water supply pump 7 so that the pressure of the water supplied to the injector 17 higher than the pressure of the gas supplied to the fuel cell 1.

The number of rotations of the collected water supply pump 7 may be controlled by using a pressure gauge to detect the water pressure, or by using a preset data table to determine the relationship between the gas supply pressure and the number of rotations of the collected water supply pump 7.

Figure 7:
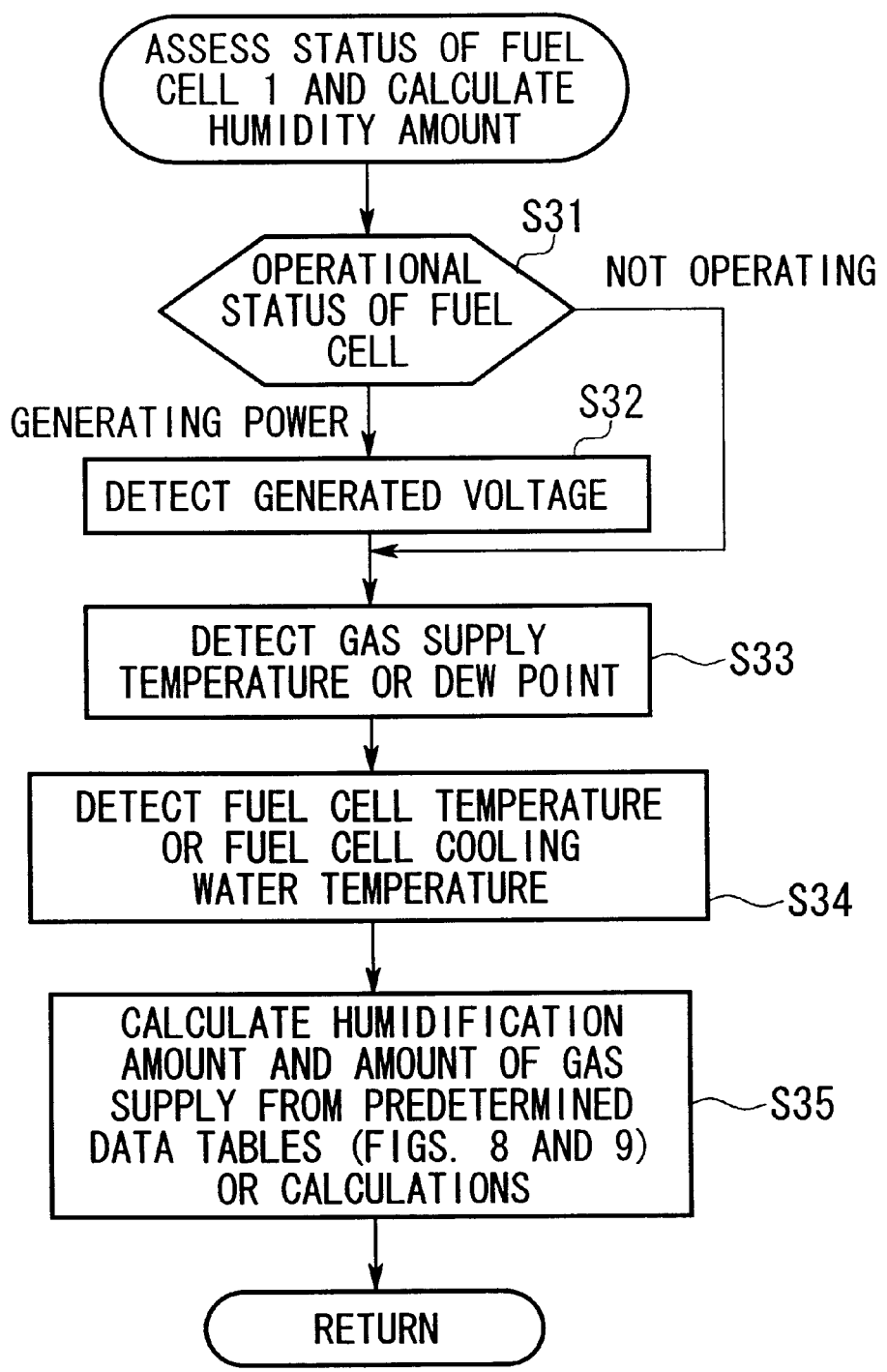
FIG. 7 is a flowchart showing a subroutine for assessing the status of the fuel cell and calculating the amount of humidification.

Subsequently, a subroutine for assessing the status of the fuel cell 1 and calculating the amount of humidification (step S21 of FIG. 6) will be explained based on FIG. 7.

Firstly, the operational status of the fuel cell 1 is determined in step S31.

More specifically, it is determined whether the fuel cell 1 is generating power or is not operational. When the fuel cell 1 is generating power, the flow proceeds to step S32 in which the generated voltage is detected. When the fuel cell 1 is not operational, the process of step S32 is skipped.

Subsequently, in step S33, the temperature of the gas supply to the fuel cell 1 or the dew point are detected by a temperature gauge (not shown) or a dew point gauge (not shown). In step S34, the temperature of the fuel cell or the temperature of the fuel cell cooling water is detected by a temperature gauge (not shown).

Figure 8:
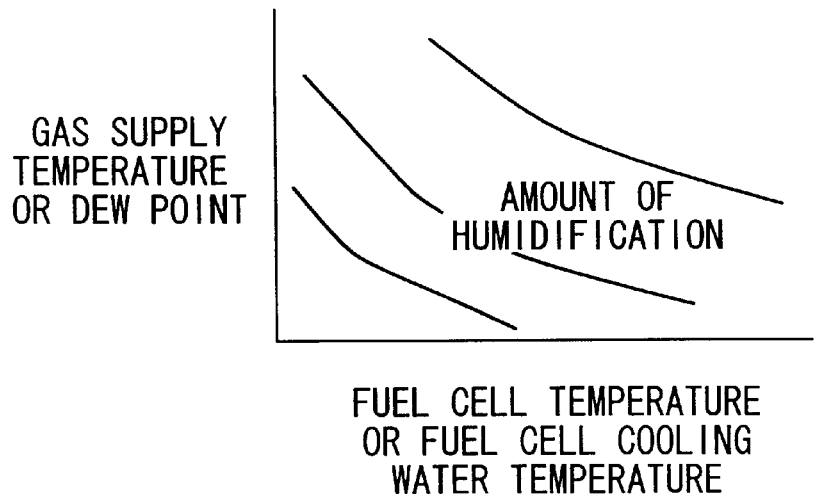
FIG. 8 is a map for determining the amount of humidification from the fuel cell temperature or the fuel cell cooling water temperature, and the supply gas temperature or the dew point.
Figure 9:
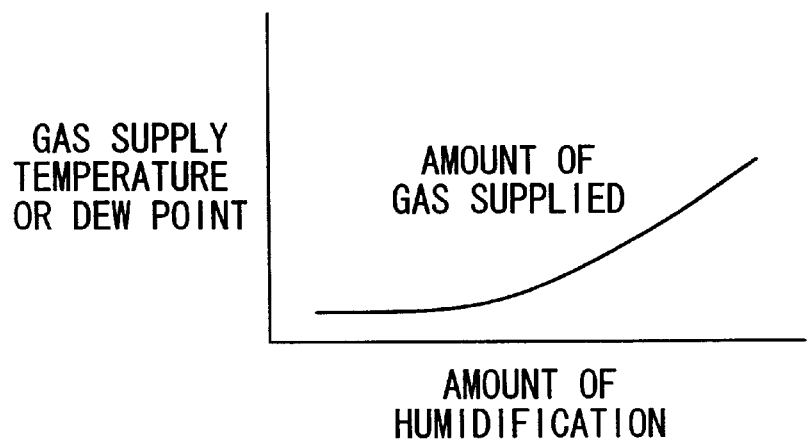
FIG. 9 is a map for determining the gas supply amount from the gas supply temperature or the dew point and the amount of humidification.

In step S35, the amount of humidification and the amount of gas supply are calculated by using predetermined data tables (see FIGS. 8 and 9) or calculation equations, and the ECU returns to the subroutine of FIG. 6.

Figure 10:
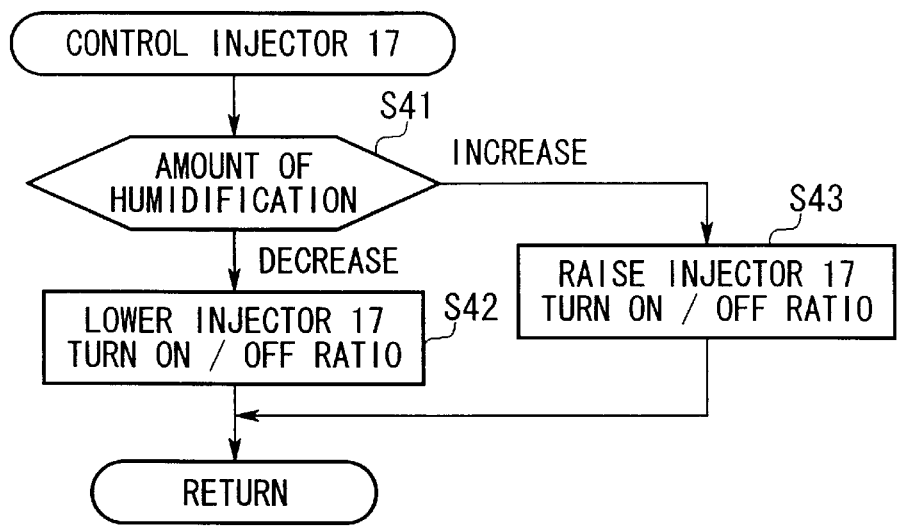
FIG. 10 is a flowchart showing an operation control subroutine of an injector.

Subsequently, a subroutine (step S27 in FIG. 6) for controlling the operation of the injector 17 will be explained based on FIG. 10. This operation control subroutine controls the amount of the water injection of the injector 17 based on the amount of humidification calculated in step S35 of FIG. 7.

Firstly, in step S41, an increase in the amount of humidification is determined.

Specifically, the amount of humidification calculated in the step S35 (see FIG. 7) of the present subroutine is compared with the amount of humidification calculated in the previous subroutine.

When the amount of humidification has decreased, the flow proceeds to S42 in which the ON/OFF ratio of the operation of the injector 17 is lowered. When the amount of humidification has increased, the flow proceeds to S43 in which the ON/OFF ratio of the operation of the injector 17 is raised.

After executing steps S42 or S43, the flow returns to the subroutine of FIG. 6.

Subsequently, a subroutine for collecting water (step S5 of FIG. 4) will be explained based on FIG. 11.

Firstly, in step S51, the collected water amount detector 10 detects the amount of collected water in the collected water storage tank 4, and, in step S52, it is determined whether the detected amount of collected water is equal to or exceeds a predetermined upper limit (full tank).

When the amount of collected water is equal to or exceeds the predetermined value, the subroutine for transferring the collected water 9 of step S53 is executed and the flow returns to step S51.

On the other hand, when the amount of collected water is less than the predetermined value, the flow returns to step S51 without executing step S53.

Subsequently, the subroutine for transferring the collected water 9 (step S53 of FIG. 11) will be explained based on FIG. 12.

Firstly, in step S61, an auxiliary tank water amount detector (not shown), which is provided inside the humidifying water auxiliary tank 18, detects the amount of auxiliary water. In step S62, it is determined whether the detected amount of auxiliary water is equal to or exceeds an upper limit (full tank).

When the amount of auxiliary water is equal to or exceeds the upper limit, the flow proceeds to step S63 in which the subroutine for discharging the collected water 9 (FIG. 13) is executed. Thereafter, the flow returns to the subroutine of FIG. 11.

On the other hand, when the amount of auxiliary water is less than the upper limit, the flow proceeds to step S64 in which the three way valve 21 is switched to the humidifying water auxiliary tank 18 side.

In step S65, the collected water supply pump 7 is operated and the collected water 9 is transferred to the humidifying water auxiliary tank 18.

The number of rotations of the collected water supply pump 7 is set to a level such that the collected water 9 can be transferred to the humidifying water auxiliary tank 18.

Thereafter, in step S66, the collected water amount detector 10 detects the amount of collected water in the collected water storage tank 4, and, in step S67, it is determined whether the detected amount of collected water is equal to or exceeds a lower limit.

When the amount of collected water is equal to or exceeds the lower limit, the flow returns to step S65 and continues to transfer the collected water 9.

On the other hand, when the amount of collected water is below the lower limit, in step S68, the operation of the collected water supply pump 7 is stopped and the transfer of collected water 9 to the humidifying water auxiliary tank 18 is terminated. Thereafter, the flow returns to the subroutine of FIG. 11.

Subsequently, the subroutine for exhausting the collected water 9 (step S63 of FIG. 12) will be explained based on FIG. 13.

Firstly, in step S71, the drain valve 8 is opened and surplus water is exhausted to the outside.

Subsequently, in step S72, the collected water amount detector 10 detects the amount of collected water in the collected water storage tank 4, and, in step S73, it is determined whether the detected amount of collected water is equal to or exceeds a predetermined upper limit, or is below this limit.

When the amount of collected water is equal to or exceeds the predetermined upper limit, the flow returns to step S72 and continues to exhaust the surplus water.

On the other hand, when the amount of collected water is below the predetermined upper limit, in step S74, the drain valve is closed, stopping the exhaust of the collected water 9, and the flow returns to the subroutine of FIG. 12.

Subsequently, a subroutine for preventing freezing (step S2 of FIG. 4) will be explained based on FIG. 14.

Firstly, in step S81, it is determined whether the water temperature of the collected water storage tank 4 or the humidifying water auxiliary tank 18 is less than a predetermined temperature (e.g. 3° C).

When the water temperature is less than the predetermined temperature, an operation for preventing the collected water from freezing is started (step S82). When the water temperature is equal to or exceeds the predetermined temperature, the operation for preventing the collected water from freezing is terminated (step S91).

To start the operation for preventing the collected water from freezing, in step S83, the three way valve 21 is switched to the humidifying water auxiliary tank 18 side.

Subsequently, after the humidifying water auxiliary valve 20 has been opened in step S84, the collected water supply pump 7 starts operating intermittently in step S85.

The number of rotations at this time is set to a level such that the water flows slowly in the interconnecting pipe.

Thereafter, in step S86, it is determined whether the temperature of the collected water 9 is below a predetermined temperature (e.g. 1° C.).

When the temperature of the collected water is below the predetermined temperature, the flow proceeds to step S87, in which it is determined whether an outside air temperature, obtained by using an outside air temperature sensor (not shown), is below a predetermined temperature (e.g. 0° C.).

When the outside air temperature is equal to or exceeds the predetermined temperature, the flow proceeds to step S88, in which the collected water supply pump 7 is started to operate continuously. Then, the flow returns to the main routine of FIG. 4.

On the other hand, when the outside air temperature is below the predetermined temperature, the flow proceeds to step S89, in which an electrical heater (not shown) provided in one or all of the collected water storage tank 4, the humidifying water auxiliary tank 18, and the humidification water circulating pipe for preventing freezing (auxiliary humidification pipe) 22, starts heating. Thereafter, the flow returns to the main routine of FIG. 4.

Conversely, in step S86, when the temperature of the collected water 9 is equal to or exceeds the predetermined temperature, the flow proceeds to step S94, in which the heating of the water by an electrical heater (not shown) is stopped and the flow returns to the main routine of FIG. 4.

To end the freezing prevention of the collected water, the intermittent operation of the collected water supply pump 7 is ended in step S92, and the humidifying water auxiliary valve 20 is closed in step S93.

In step S94, the heating of the water by an electrical heater (not shown) is stopped and the flow returns to the main routine of FIG. 4.

That is, when the water temperatures in the collected water storage tank 4 or the humidifying water auxiliary tank 18 have fallen below 3° C., the three way valve 21 is opened to the humidifying water auxiliary tank 18 side and the collected water supply pump 7 is operated at intervals. Consequently, the collected water 9 is fed back between the collected water storage tank 4 and the humidifying water auxiliary tank 18 along the humidification water circulating pipe for preventing freezing 22.

The operation of the heater ends when the water temperature rises 1° C. or above, or when the outside air temperature has risen 0° C. or above.

In the step S81 of the subroutine for preventing freezing described above, the water temperatures in the collected water storage tank 4 or the humidifying water auxiliary tank 18 were determined, but the temperature of the fuel cell 1 may be determined instead.

Modification of the First Embodiment

Figure 15:
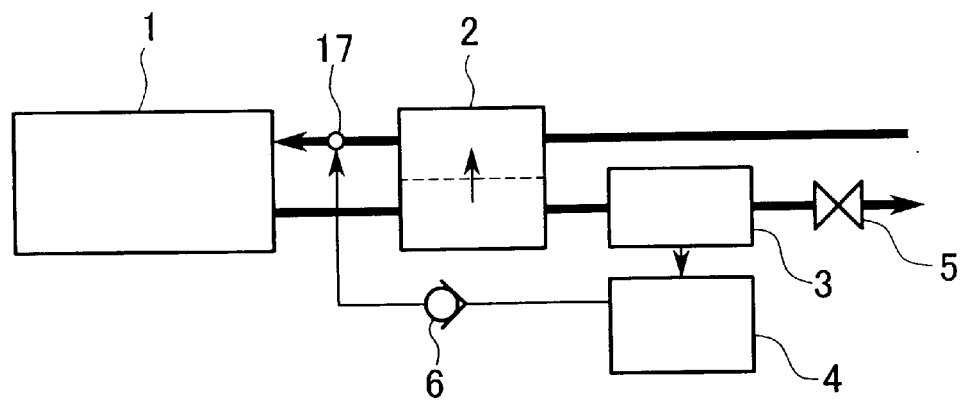
FIG. 15 is a diagram showing the system constitution of one modification of the first embodiment.

FIG. 15 shows a modification of the first embodiment.

The humidifier according to this modification does not have the humidifying water auxiliary tank 18, the humidifying water auxiliary valve 20, the three way valve 21, and the humidification water circulating pipe for preventing freezing 22, which were shown in FIG. 1. Consequently, freezing can be prevented by providing an electrical heater (anti-freeze apparatus; not shown in FIG. 15) inside the collected water storage tank 4.

The control flow of the humidifier in this modification is basically the same as that shown in FIGS. 4 to 14. However, since the humidifying water auxiliary tank 18 is not provided, the step S53 of FIG. 11 changes from "move collected water 9" to "exhaust collected water 9".

Figure 11:
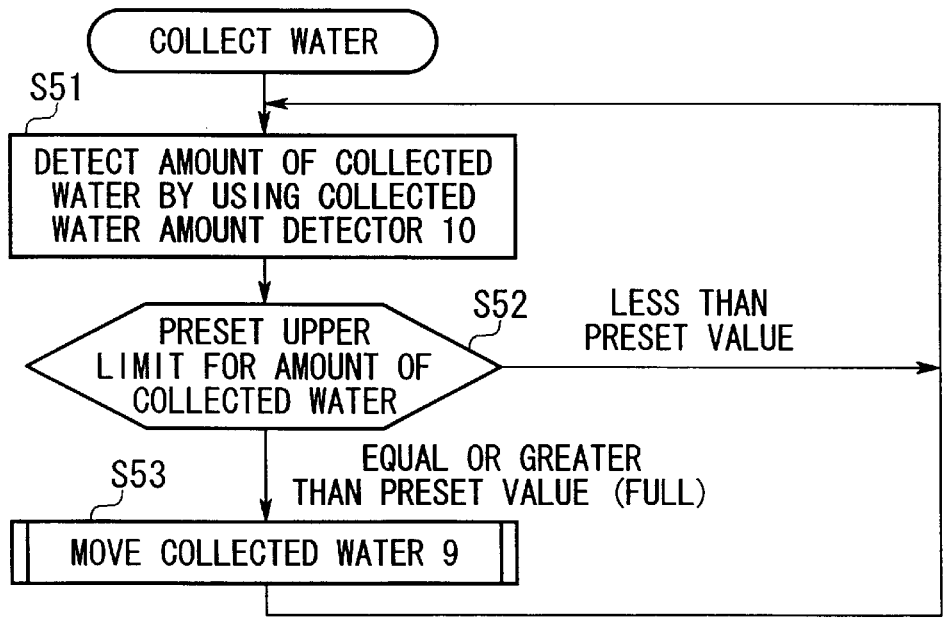
FIG. 11 is a flowchart showing a water collecting subroutine.
Figure 12:
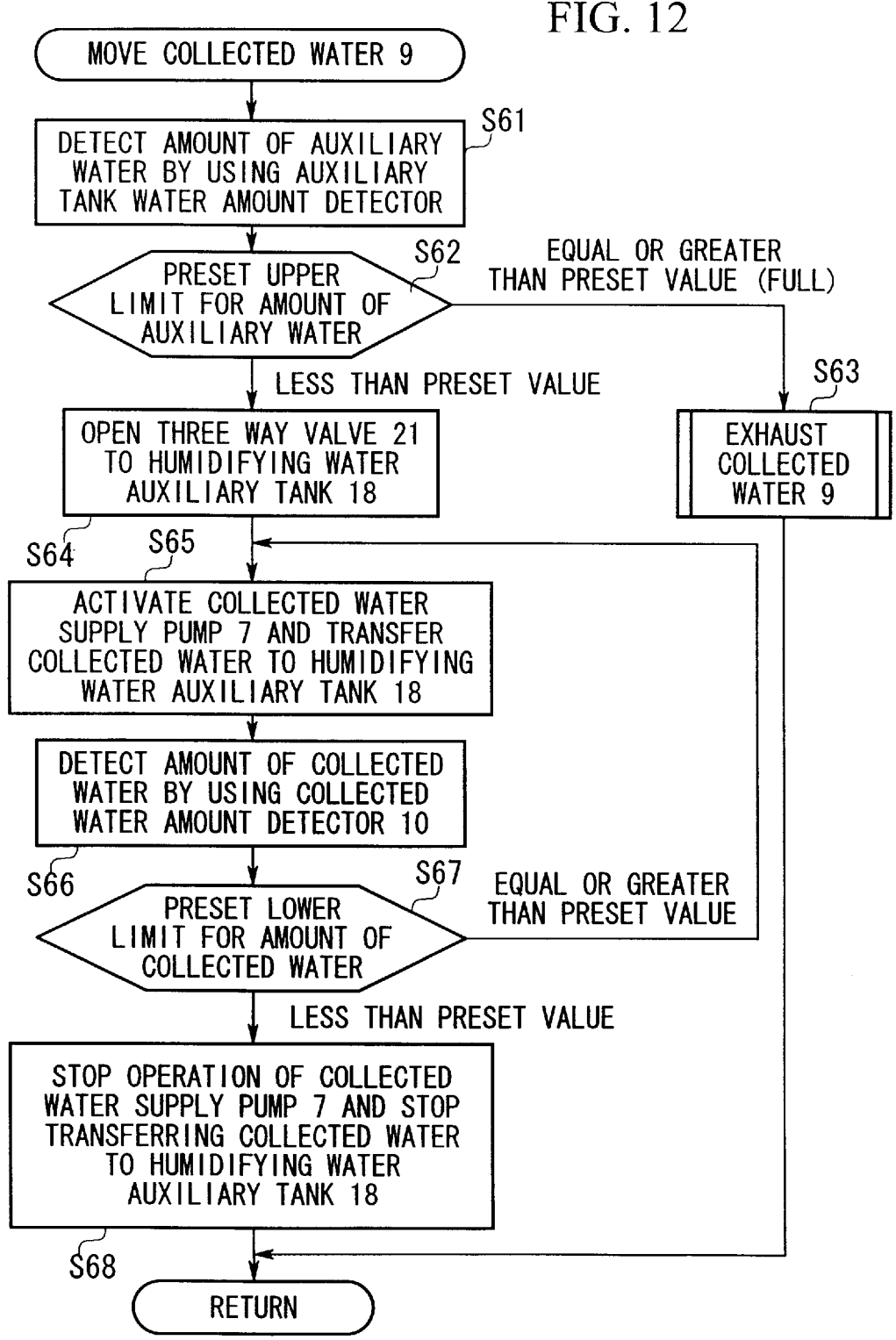
FIG. 12 is a flowchart showing a subroutine for transferring collected water.
Figure 13:
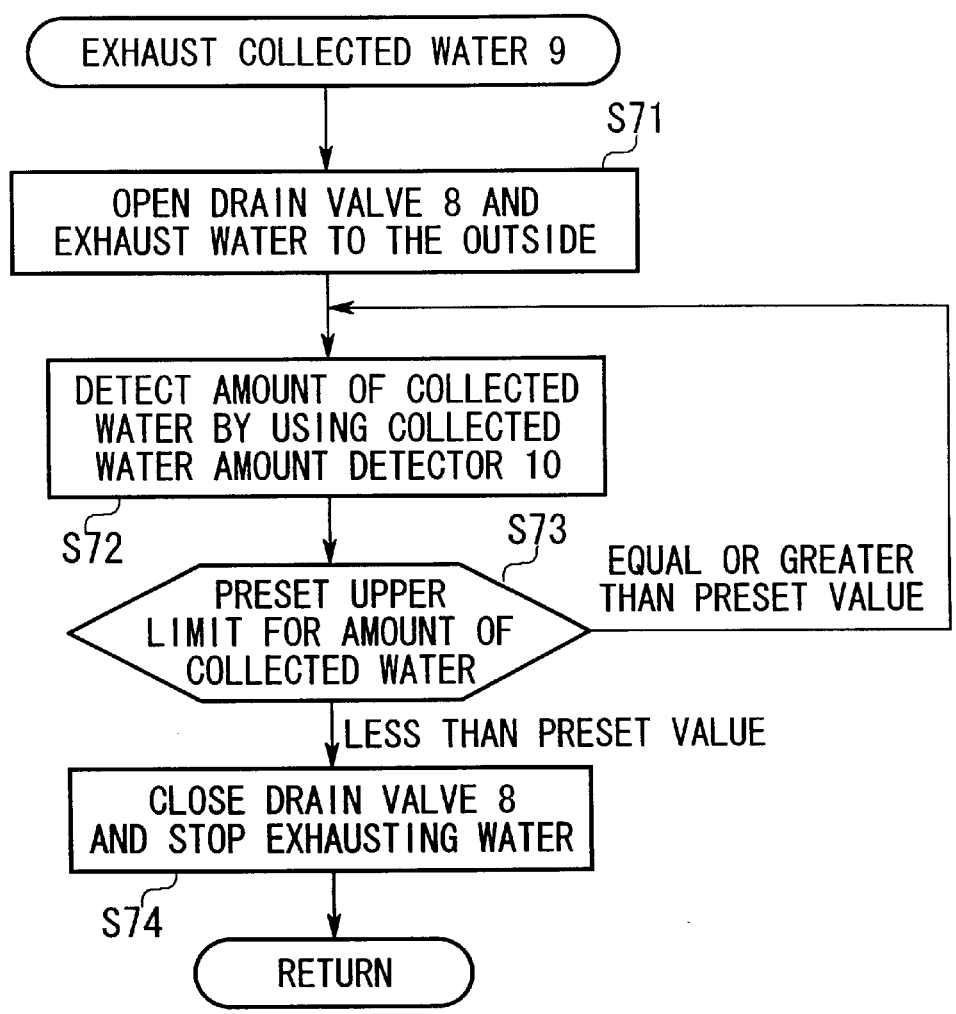
FIG. 13 is a flowchart showing a subroutine for exhausting collected water.

Therefore, the subroutine of FIG. 12 is completely deleted, and the subroutine of FIG. 13 is executed in step S53 of FIG. 11, discharging the collected water 9.

Embodiment 2

Subsequently, a humidifier according to a second embodiment will be explained based on FIG. 16.

This humidifier differs from that described in the first embodiment (FIG. 1), where the collected water 9 is injected between the air electrode intake side of the fuel cell 1 and the hollow fiber membrane water collecting apparatus 2, in respect of the point that the collected water 9 from the collected water storage tank 4 is injected between the air electrode exhaust side of the fuel cell 1 and the hollow fiber membrane water collecting apparatus 2. Otherwise, the constitution is the same as that of FIG. 1.

The collected water 9 from the collected water storage tank 4 passes the check valve 6, is atomized by the injector 17, and is supplied along the exhaust pipe 12 to the hollow fiber membrane water collecting apparatus 2.

Even when the fuel cell starts operating with a dry hollow fiber membrane, the gas supply to the fuel cell 1 can be humidified in the hollow fiber membrane water collecting apparatus 2. Therefore, the fuel cell 1 can be humidified by supplying a humidified gas supply thereto, in the same manner as when generating power normally.

The control flow of the humidifier in this embodiment is the same as that in FIGS. 4 to 14.

Figure 16:
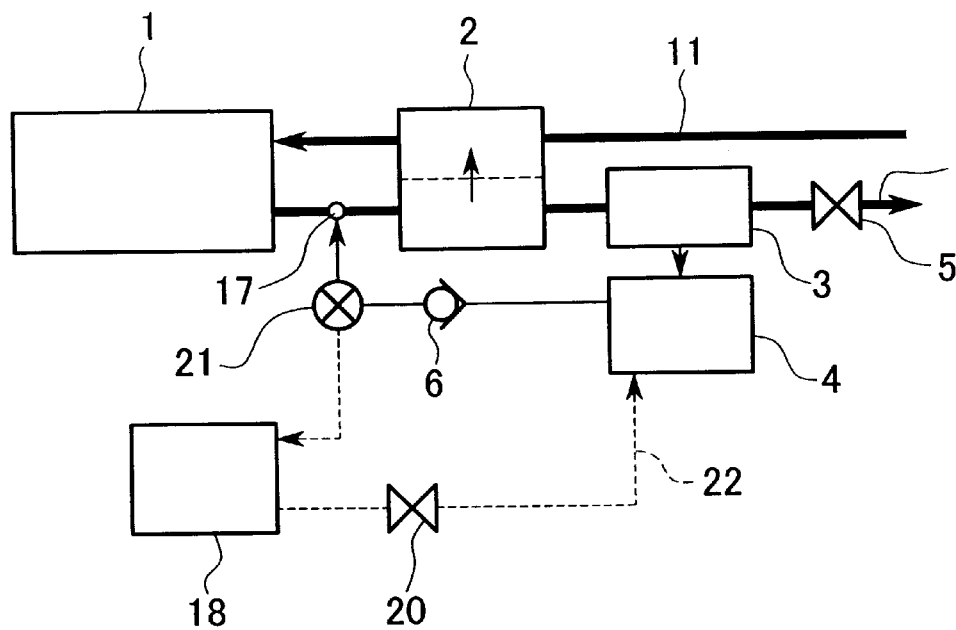
FIG. 16 is a diagram showing the system constitution of a second embodiment.

The humidifying water auxiliary tank 18, the humidifying water auxiliary valve 20, the three way valve 21, and the humidification water circulating pipe for preventing freezing 22 may be removed from the constitution of FIG. 16. In this case, part of the subroutine of FIG. 11 is changed and the subroutine of FIG. 12 becomes unnecessary, as in the modification of the first embodiment.

Embodiment 3

Subsequently, a humidifier according to a third embodiment will be explained based on FIG. 17.

This humidifier differs from that described in the first embodiment (FIG. 1) in respect of the point that a bypass pipe 41, which bypasses the hollow fiber membrane water collecting apparatus 2, is connected via three way valves 42 and 43 to the intake pipe 11, so that the collected water 9 from the collected water storage tank 4 is injected to the bypass pipe 41. Otherwise, the constitution is the same as that of FIG. 1.

The collected water 9 from the collected water storage tank 4 passes the check valve 6, is atomized by the injector 17 or a vaporizer 44, and is supplied along the bypass pipe 41 directly to the fuel cell 1. Therefore, in the same way as the first embodiment, the fuel cell 1 can be humidified even when the fuel cell starts operating with a dry hollow fiber membrane.

The control flow of the humidifier in this embodiment is the same as that in FIGS. 4 to 14. However, when the injector 17 is replaced by the vaporizer 44, the step S27 of FIG. 6 is changed from "control injector 17" to "control amount of gas injected to the vaporizer".

Figure 18:
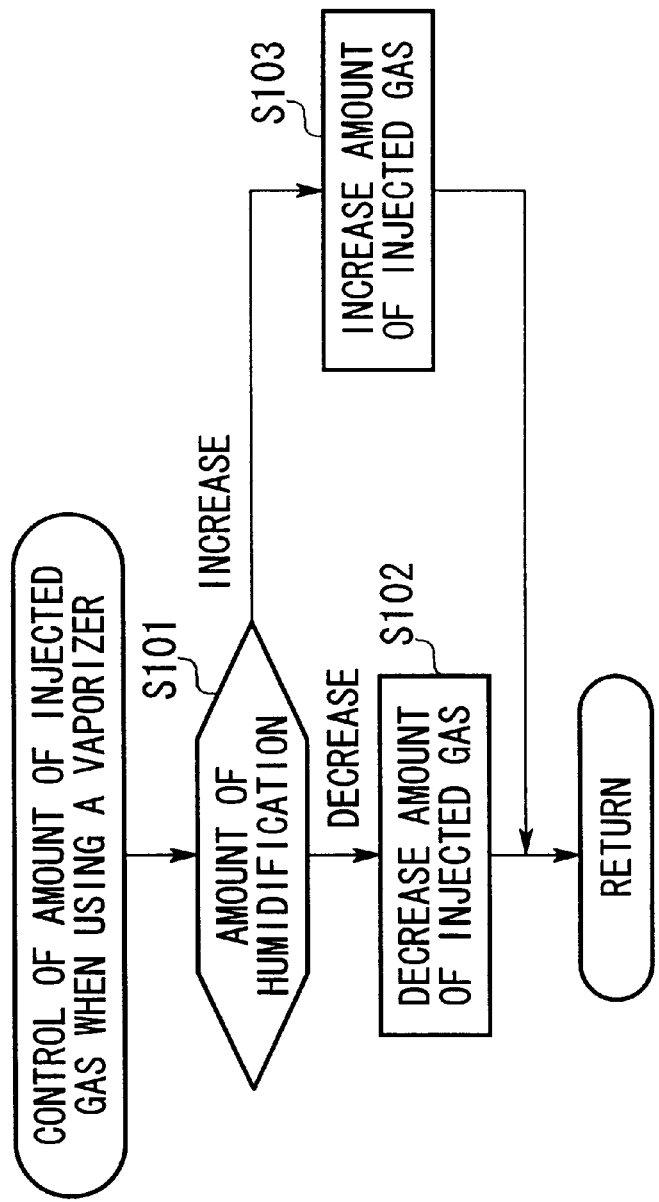
FIG. 18 is a flowchart showing a subroutine for controlling the amount of gas injected to a vaporizer.

A subroutine for controlling the amount of gas injected to the vaporizer will be explained using FIG. 18. This subroutine controls the amount of injected gas of the vaporizer 44 based on the gas supply amount which was calculated in step S35 of FIG. 7.

Firstly, in step S101, an increase in the amount of humidification is determined.

Specifically, the amount of humidification calculated in step S35 (FIG. 7) of the present subroutine is compared with the amount of humidification calculated in the previous subroutine.

When the amount of humidification has decreased, the flow proceeds to S102, in which the injected gas amount is reduced, and then returns to the subroutine of FIG. 6.

On the other hand, when the amount of humidification has increased, the flow proceeds to S103, in which the injected gas amount is increased, and then returns to the subroutine of FIG. 6.

Figure 17:
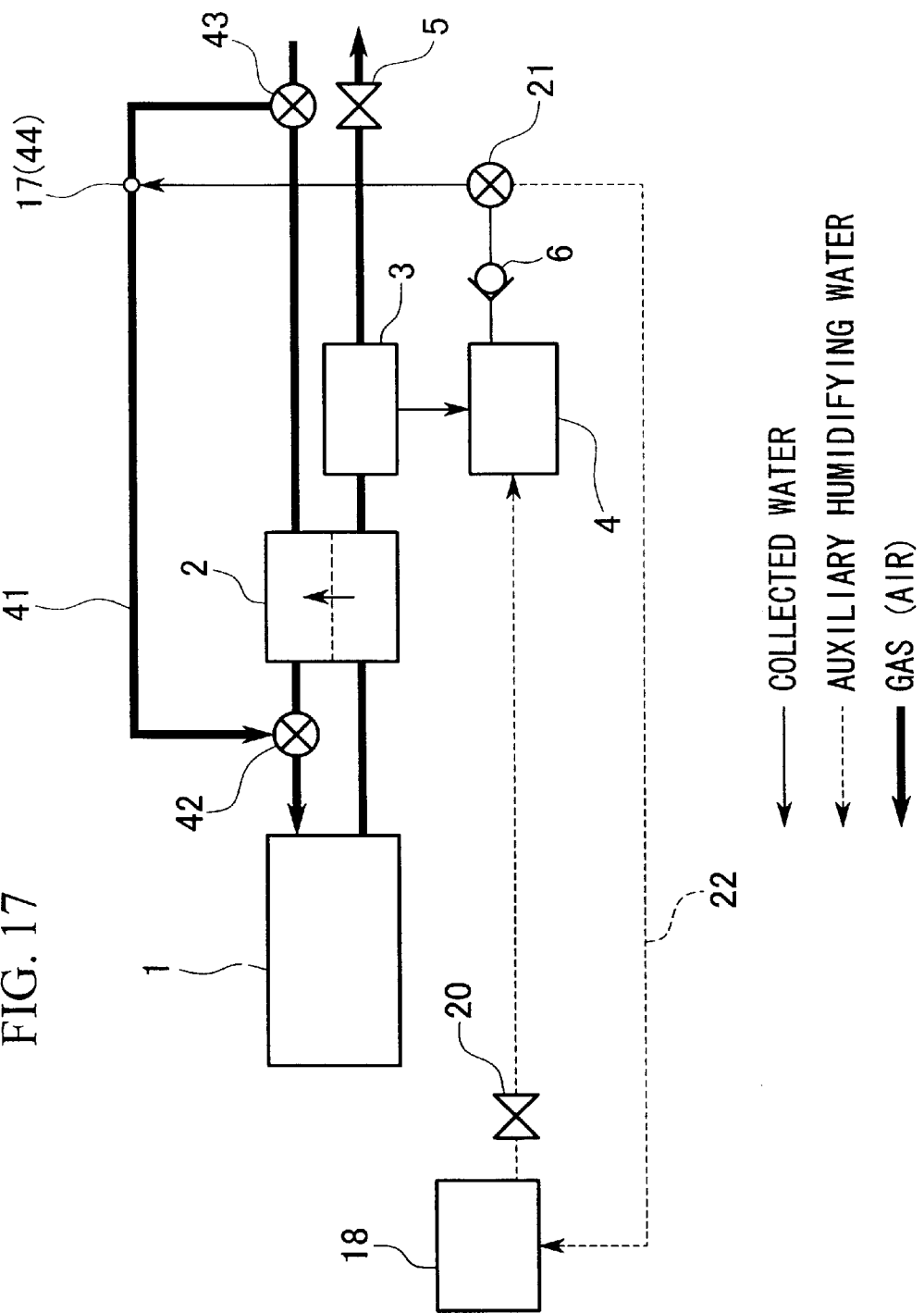
FIG. 17 is a diagram showing the system constitution of a third embodiment.

The humidifying water auxiliary tank 18, the humidifying water auxiliary valve 20, the three way valve 21, and the humidification water circulating pipe for preventing freezing 22 may be removed from the constitution of FIG. 17. In this case, part of the subroutine of FIG. 11 is changed and the subroutine of FIG. 12 becomes unnecessary, as in the modification of the first embodiment.

Embodiment 4

Subsequently, a humidifier according to a fourth embodiment will be explained based on FIG. 19.

This humidifier differs from that in the embodiments and modifications thereof already described, which humidify the air electrode of the fuel cell 1, in respect of the point that it humidifies the fuel electrode of the fuel cell 1.

The basic constitution is substantially similar to that shown in FIG. 1, but differs in respect of the following points.

A first difference is that the exhaust gas from the fuel electrode is not exhausted after passing the hollow fiber membrane water collecting apparatus 2 and the vapor/liquid separator 3, but is returned to the intake pipe 11 via a fuel gas ejector 25.

A second difference is that a U-shaped gas back flow preventing pipe 19 is connected between the humidifying water auxiliary valve 20 and the collected water storage tank 4.

The gas back flow preventing pipe 19 detains the water in this section, thereby preventing the fuel gas, which is heading from the vapor/liquid separator 3 via the collected water storage tank 4 toward the humidifying water auxiliary tank 18, from flowing counter to the stream.

In this embodiment, the collected water 9 from the collected water storage tank 4 passes the check valve 6, is atomized by the injector 17, and is supplied along the exhaust pipe 12 to the hollow fiber membrane water collecting apparatus 2. Therefore, the gas supply to the fuel cell 1 can be humidified in the hollow fiber membrane water collecting apparatus 2 even when the fuel cell starts operating with a dry hollow fiber membrane.

Consequently, the fuel cell 1 can be humidified in the same manner as when generating power normally by supplying a gas supply, which has been humidified by the hollow fiber membrane water collecting apparatus 2, to the fuel cell 1.

The control flow of the humidifier in this embodiment is also the same as that in FIGS. 4 to 14.

Figure 19:
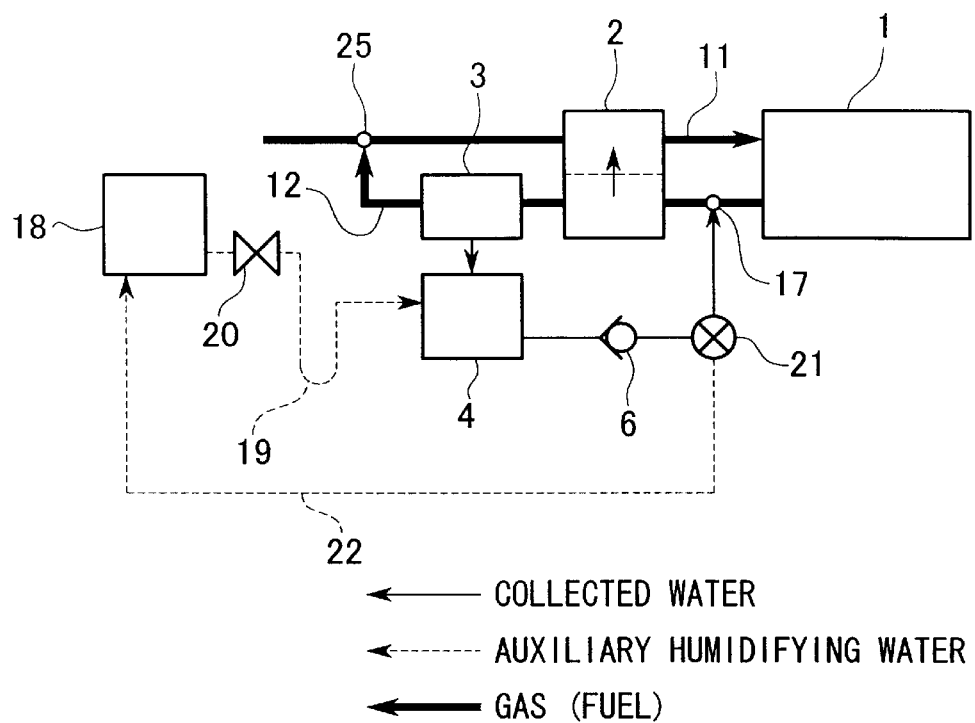
FIG. 19 is a diagram showing the system constitution of a fourth embodiment.
Figure 20:
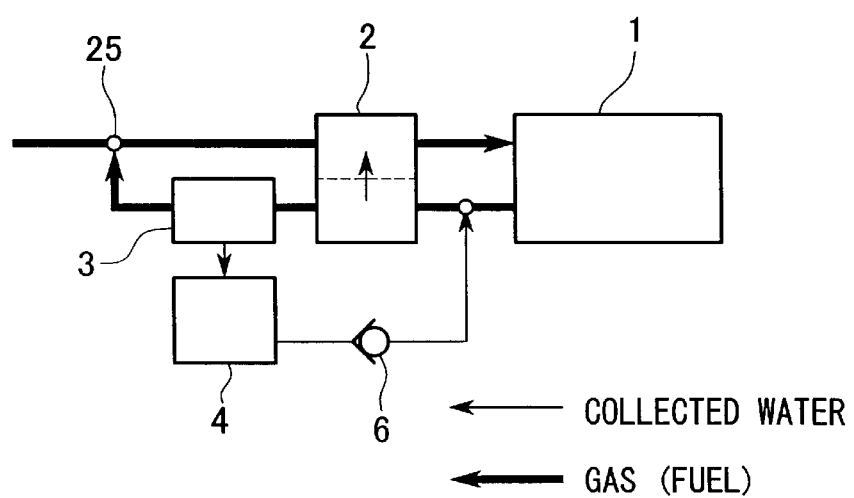
FIG. 20 is a diagram showing the system constitution of one modification of the fourth embodiment.

The humidifying water auxiliary tank 18, the gas back flow preventing pipe 19, the humidifying water auxiliary valve 20, the three way valve 21, and the humidification water circulating pipe for preventing freezing 22 may be removed from the constitution of FIG. 19 to form the system shown in FIG. 20. In this case, part of the subroutine of FIG. 11 is changed and the subroutine of FIG. 12 becomes unnecessary, as in the modification of the first embodiment.

Embodiment 5

Subsequently, a humidifier according to a fifth embodiment will be explained based on FIG. 21.

Figure 21:
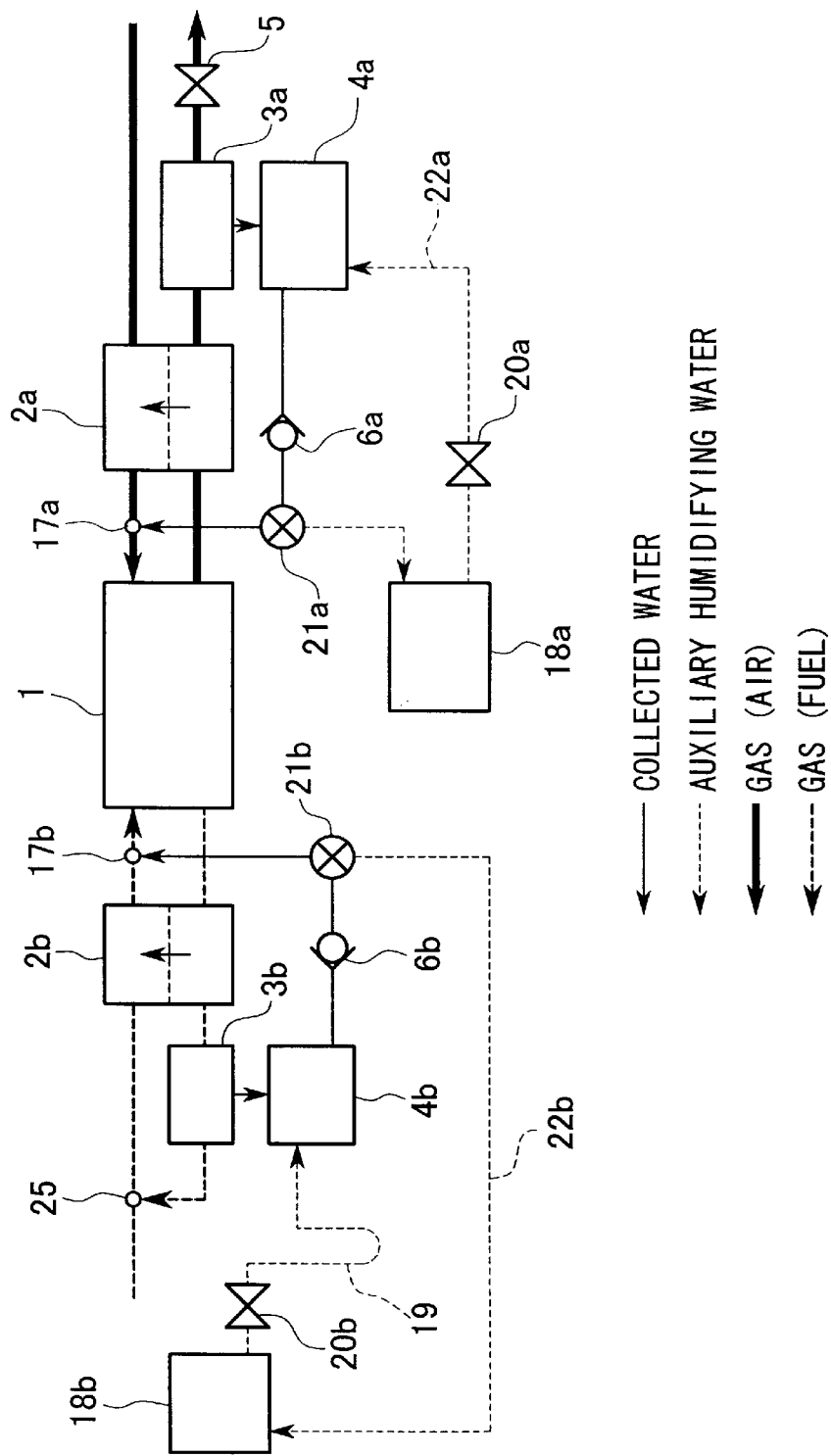
FIG. 21 is a diagram showing the system constitution of a fifth embodiment.

In FIG. 21, for sake of convenience, letter "a" is added to the reference numerals representing the constituent elements which are used in humidifying the air electrode side, and letter "b" is added to the reference numerals representing the constituent elements which are used in humidifying the fuel electrode side.

This fuel cell system humidifies both the air and fuel electrodes of the fuel cell 1, and combines the constitution of FIG. 1 with a constitution obtained by modifying the constitution of FIG. 19 by shifting the injection position of the collected water 9 to between the hollow fiber membrane water collecting apparatus 2 and the fuel electrode intake side of the fuel cell 1. It therefore obtains the same advantages as the embodiments and modification thereof described already.

The control flow of the humidifier in this embodiment is also the same as that in FIGS. 4 to 14.

The humidifying water auxiliary tanks 18a and 18b, the gas back flow preventing pipe 19, the humidifying water auxiliary valves 20a and 20b, the three way valves 21a and 21b, and the humidification water circulating pipes for preventing freezing 22a and 22b may be removed from the constitution of FIG. 21. In this case, part of the subroutine of FIG. 11 is changed and the subroutine of FIG. 12 becomes unnecessary, as in the modification of the first embodiment.

Embodiment 6

Subsequently, a humidifier according to a sixth embodiment will be explained based on FIG. 22.

In this humidifier, the vapor/liquid separator 3 of the first embodiment (FIG. 1) is provided further upstream on the exhaust pipe 12 than the hollow fiber membrane water collecting apparatus 2. That is, this humidifier differs from the first embodiment (FIG. 1) in respect of the point that the vapor/liquid separator 3 is provided between the air electrode exhaust side of the fuel cell 1 and the hollow fiber membrane water collecting apparatus 2. Otherwise, the constitution is identical to that of FIG. 1.

In this embodiment, the water content in the gas exhausted from the air electrode exhaust side of the fuel cell 1 is partially collected by the vapor/liquid separator 3 and used for auxiliary humidification. In addition, part of the uncollected water is further collected by the hollow fiber membrane water collecting apparatus 2. Therefore, by using auxiliary humidification, the fuel cell 1 can be humidified as in the first embodiment even when the fuel cell starts operating with a dry hollow fiber membrane.

The control flow of the humidifier in this embodiment is the same as that in FIGS. 4 to 14. Furthermore, the humidifying water auxiliary tank 18, the humidifying water auxiliary valve 20, the three way valve 21, and the humidification water circulating pipe for preventing freezing 22 may be removed from the constitution of FIG. 22. In this case, part of the subroutine of FIG. 11 is changed and the subroutine of FIG. 12 becomes unnecessary, as in the modification of the first embodiment.

Embodiment 7

Subsequently, a humidifier according to a seventh embodiment will be explained based on FIG. 23.

In this humidifier, the vapor/liquid separator 3 of the first embodiment (FIG. 1) is provided further downstream on the exhaust pipe 12 than the air electrode back pressure adjusting valve 5. That is, this humidifier differs from the first embodiment (FIG. 1) in respect of the point that the vapor/liquid separator 3 is provided on the exit side of the air electrode back pressure adjusting valve 5. Otherwise, the constitution is identical to that of FIG. 1.

In this embodiment, the water content in the gas exhausted from the air electrode exhaust side of the fuel cell 1 is partially collected by the hollow fiber membrane water collecting apparatus 2. Then, part of the uncollected water is further collected by the vapor/liquid separator 3, and is used for auxiliary humidification. Therefore, by using auxiliary humidification, the fuel cell 1 can be humidified as in the first embodiment even when the fuel cell starts operating with a dry hollow fiber membrane.

The control flow of the humidifier in this embodiment is the same as that in FIGS. 4 to 14. Furthermore, the humidifying water auxiliary tank 18, the humidifying water auxiliary valve 20, the three way valve 21, and the humidification water circulating pipe for preventing freezing 22 may be removed from the constitution of FIG. 23. In this case, part of the subroutine of FIG. 11 is changed and the subroutine of FIG. 12 becomes unnecessary, as in the modification of the first embodiment.

Embodiment 8

Figure 24:
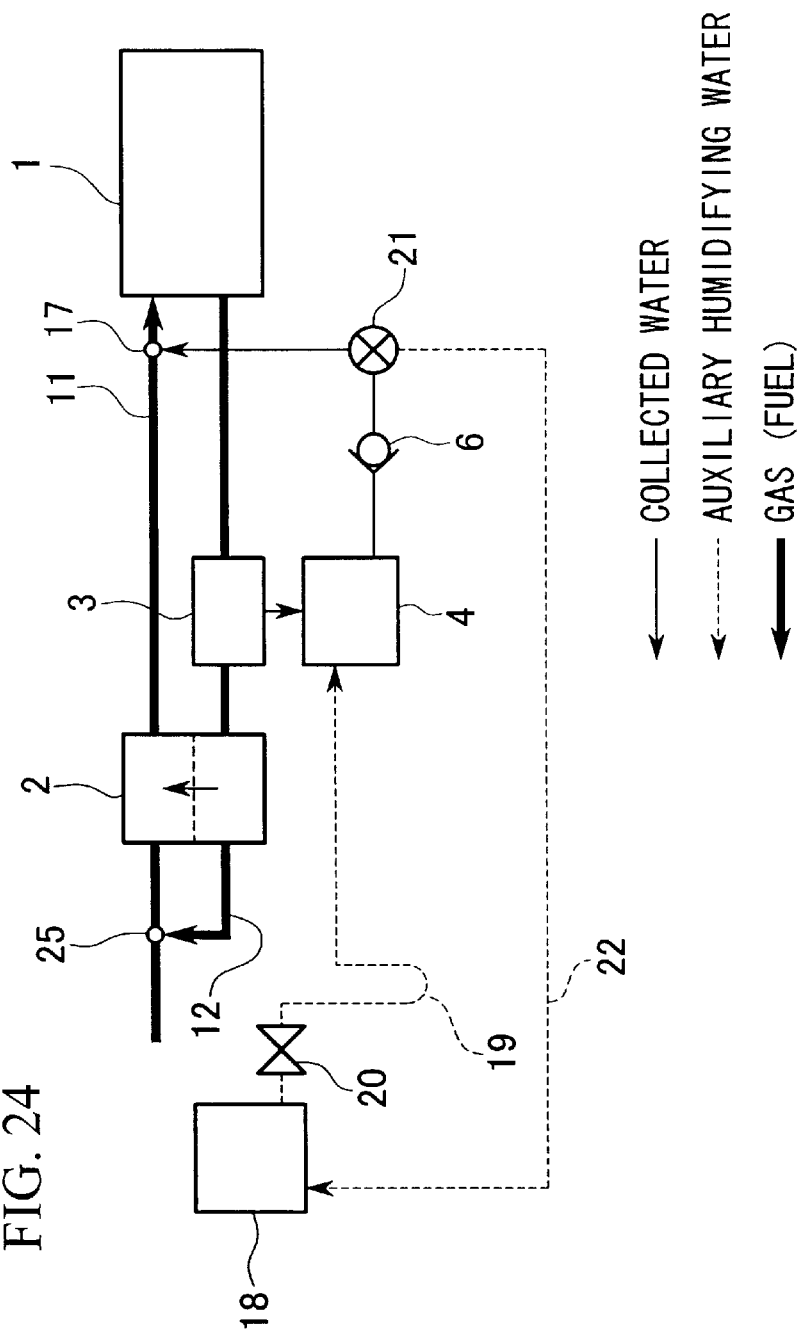
FIG. 24 is a diagram showing the system constitution of an eighth embodiment.

Subsequently, a humidifier according to an eighth embodiment will be explained based on FIG. 24.

In this humidifier, the vapor/liquid separator 3 of the fourth embodiment (FIG. 19) is provided further upstream on the exhaust pipe 12 than the hollow fiber membrane water collecting apparatus 2. That is, this humidifier differs from the fourth embodiment (FIG. 19) in respect of the points that the vapor/liquid separator 3 is provided between the fuel electrode exhaust side of the fuel cell 1 and the hollow fiber membrane water collecting apparatus 2, and the injector 17 is provided on the intake side of the fuel cell 1 instead of on the exhaust side thereof. Otherwise, the constitution is identical to that of FIG. 19.

In this embodiment, the water content in the gas exhausted from the fuel electrode exhaust side of the fuel cell 1 is partially collected by the vapor/liquid separator 3 and used for auxiliary humidification. In addition, part of the uncollected water is further collected by the hollow fiber membrane water collecting apparatus 2. Therefore, by using auxiliary humidification, the fuel cell 1 can be humidified as in the fourth embodiment even when the fuel cell starts operating with a dry hollow fiber membrane.

The control flow of the humidifier in this embodiment is the same as that in FIGS. 4 to 14. Furthermore, the humidifying water auxiliary tank 18, the gas back flow preventing pipe 19, the humidifying water auxiliary valve 20, the three way valve 21, and the humidification water circulating pipe for preventing freezing 22 may be removed from the constitution of FIG. 24. In this case, part of the subroutine of FIG. 11 is changed and the subroutine of FIG. 12 becomes unnecessary, as in the modification of the first embodiment.

Embodiment 9

Subsequently, a humidifier according to a ninth embodiment will be explained based on FIG. 25.

In this embodiment, in view of the fact that the fuel electrode side tends to become insufficient humidification as compared with the air electrode side of the fuel cell 1, the product water created on the air electrode side is collected to supply to the fuel electrode side for water injection.

Figure 25:
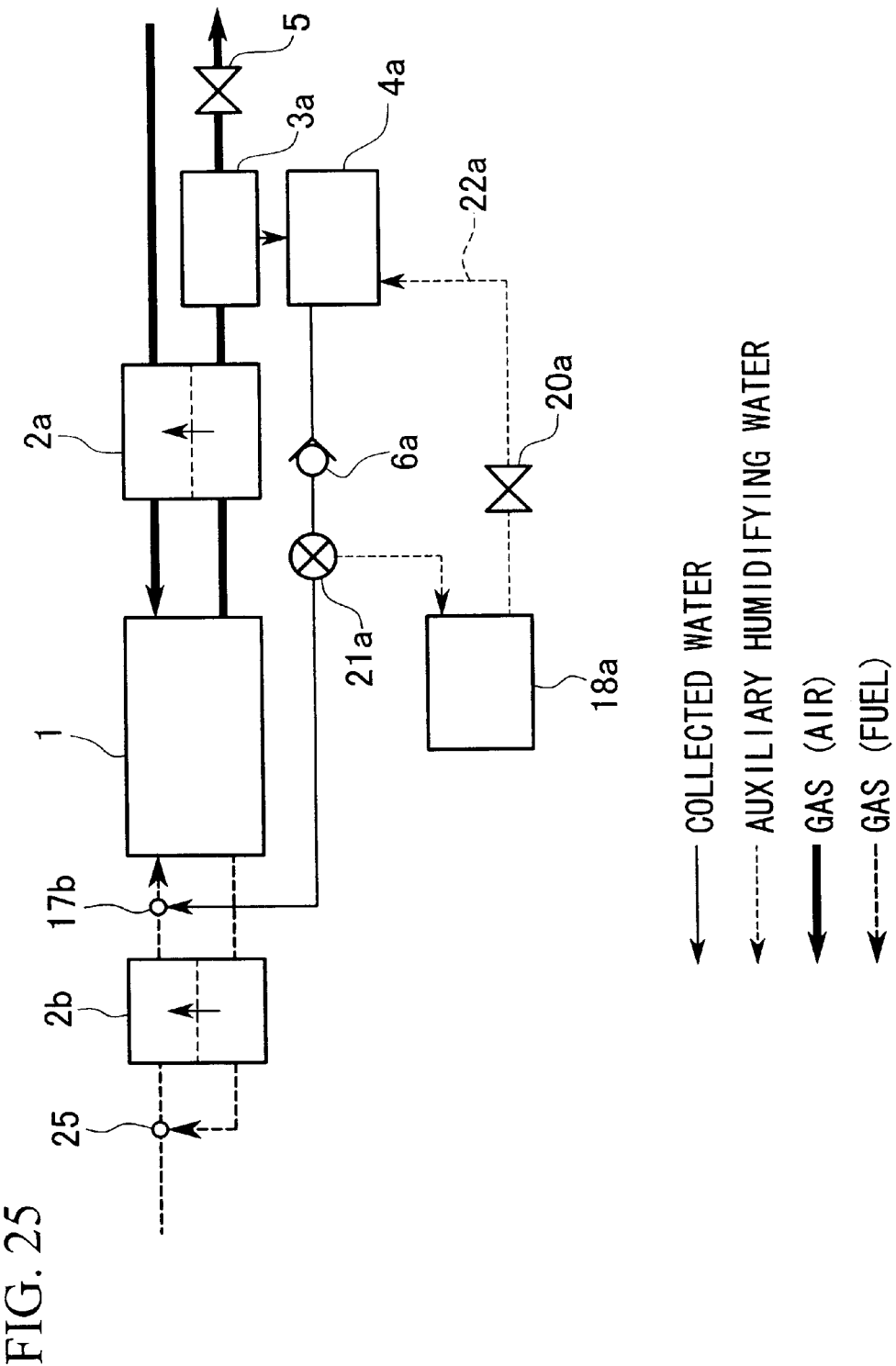
FIG. 25 is a diagram showing the system constitution of a ninth embodiment.

The constitution of the embodiment shown in FIG. 25 is based on the constitution of the fifth embodiment (FIG. 21) which humidifies the fuel electrode and air electrode sides. However, the injector 17a on the air electrode side, the vapor/liquid separator 3b, the collected water storage tank 4b, the check valve 6b, the humidifying water auxiliary tank 18b, the gas back flow preventing pipe 19, the humidifying water auxiliary valve 20b, the three way valve 21b, and the humidification water circulating pipe for preventing freezing 22b on the fuel electrode side in FIG. 21 are not provided. In FIG. 21, the three way valve 21a is connected to the injector 17a, but in this embodiment the three way valve 21a is connected to the injector 17b on the fuel electrode side.

In this embodiment, the collected water, which is collected on the air electrode side and stored in the collected water storage tank 4*a*, passes the check valve 6*a* and the three way valve 21*a*, is atomized by the injector 17*b*, and injected into the intake pipe on the fuel electrode side, humidifying the gas supply to the fuel electrode intake side. For this reason, even when the humidification on the fuel electrode side becomes insufficient while the fuel cell 1 is operational, the insufficient humidification on the fuel electrode side can be supplemented on the air electrode side by using the water collected on the air electrode side.

The control flow of the humidifier in this embodiment is the same as that in FIGS. 4 to 14. Furthermore, the humidifying water auxiliary tank 18*a*, the humidifying water auxiliary valve 20*a*, the three way valve 21*a*, and the humidification water circulating pipe for preventing freezing 22*a* may be removed from the constitution of FIG. 25. In this case, part of the subroutine of FIG. 11 is changed and the subroutine of FIG. 12 becomes unnecessary, as in the modification of the first embodiment. The vapor/liquid separator 3*a* need not be provided in the position shown in FIG. 25, and may instead be provided at the positions shown in the sixth embodiment (FIG. 22) and the seventh embodiment (FIG. 23).

Embodiment 10

Subsequently, a humidifier according to a tenth embodiment will be explained. This embodiment comprises a fuel cell system used as a vehicle power plant. In the embodiments described above, when starting up the fuel cell in which the hollow fiber membrane has dried, resulting in insufficient humidification, an auxiliary injection is applied. In contrast, in this embodiment, an auxiliary injection is applied when sufficient humidification cannot be obtained only with the water-permeable-type humidifier during normal operation of the fuel cell.

Figure 26:
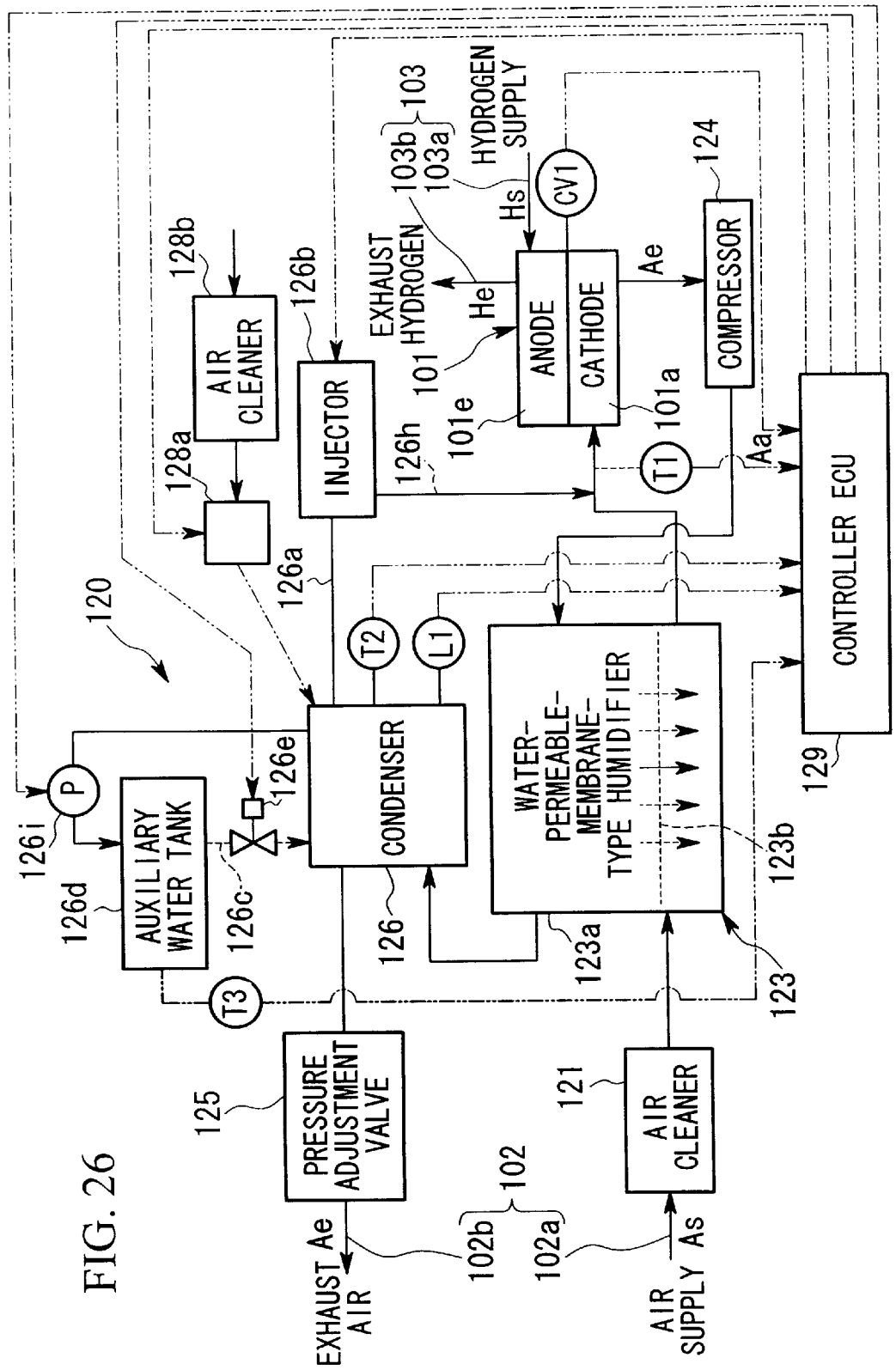
FIG. 26 is a diagram showing the system constitution of a tenth embodiment.

FIG. 26 shows a fuel cell system having a water-permeable-type humidifier. The constitution of the fuel cell system 120 is basically the same as the constitution shown in FIG. 1. For example, the fuel cell 1, the hollow fiber membrane water collecting apparatus 2, the vapor/liquid separator 3, the collected water storage tank 4, the injector 17, the humidifying water auxiliary tank 18, and the humidifying water auxiliary valve 20 shown in FIG. 1 correspond to the fuel cell 101, the water-permeable-type humidifier 123, the condenser 126, the reservoir section of the condenser 126, the injector 126*b*, the auxiliary water tank 126*d*, and the open/close valve 126*e*. On the other hand, the constitution of FIG. 26 differs from that of FIG. 1 in respect of the points that a compressor 124 for negative pressure operation by suction is provided on the exhaust side of the fuel cell 101, and the injector 126*b* obtains injection pressure by adjusting the degree of opening of a pressure adjustment valve 125.

The fuel cell system 120 comprises an air transfer passage 102 for transferring an oxidizing agent gas comprising air to the fuel cell 101, and a hydrogen transfer passage 103 for supplying a fuel gas comprising hydrogen to the fuel cell 101. The air transfer passage 102 comprises an air supply passage 102*a* for supplying air to the cathode side gas passage 101*a* of the fuel cell 101, and an air exhaust passage 102*b* for discharging exhaust air Ae exhausted from the cathode side gas passage 101*a*. An air cleaner 121 is provided upstream on the air supply passage 102*a*, the cleaned air being supplied downstream. The water-permeable-type humidifier 123 is attached to the air supply passage 102*a* and the air exhaust passage 102*b*, and collects water from the exhaust air Ae and transfers it to the air supply As. The compressor 124 comprises an exhaust gas transfer apparatus, and is provided on the air exhaust passage 102*b* downstream from the cathode side gas passage 101*a* and upstream from the water-permeable-type humidifier 123. A pressure adjustment apparatus comprising the pressure adjustment valve 125 is attached downstream from the water-permeable-type humidifier 123, and adjusts the pressure of the gas.

The water-permeable-type humidifier 123 mainly comprises an outside shell comprising a case 123*a*, and a hollow fiber membrane 123*b* for exchanging water. The hollow fiber membrane 123*b* allows water to pass from the high-humidity side of the gas flowing in and out thereof to the low-humidity side, and is attached to the air supply passage 102*a* and the air exhaust passage 102*b* so that, for example, the exhaust air Ae passes through the inside of the hollow fiber membrane 123*b* and the air supply As passes through the outside of the hollow fiber membrane 123*b*. While the exhaust air Ae is passing through the inside of the hollow fiber membrane 123*b*, the water in the exhaust air Ae is collected and transferred to the air supply As which is flowing outside.

The hydrogen transfer passage 103 comprises a hydrogen supply passage 103*a* for supplying a hydrogen supply Hs to the anode side gas passage 101*e* of the fuel cell 101, and a hydrogen exhaust passage 103*b* for discharging post-reaction exhaust hydrogen He exhausted from the anode side gas passage 101*e*. A hydrogen supply source for supplying hydrogen comprises, for example, a hydrogen supply tank (not shown), and is attached to the upstream end of the hydrogen supply passage 103*a*. A regulator (not shown) for adjusting pressure and a hydrogen circulating pump (not shown) for supplying hydrogen are provided sequentially downstream from the hydrogen supply source. A three way valve (not shown) is provided on the hydrogen exhaust passage 103*b*, and switches the exhaust hydrogen He between the hydrogen circulating pump side and the exhaust side.

Consequently, when the hydrogen circulating pump and the exhaust gas transfer apparatus comprising the compressor 124 are activated, power is generated by the chemical reaction which occurs between the air supply As traveling on the cathode side gas passage 101*a* of the fuel cell 101 and the hydrogen supply Hs traveling on the anode side gas passage 101*e*, thereby creating reactive water. A heat exchanger (not shown) thermally exchanges the air (exhaust air Ae) which has been sucked by the cathode side gas passage 101*a* of the fuel cell 101 and thereafter compressed by the compressor 124, and the air supply As which has been filtered by the air cleaner 121. As a result, the air supply As is heated to a predetermined temperature (between approximately 60 and 75° C.).

As a consequence, the operating temperature of the fuel cell 101 is approximately 80 to 90° C. In view of the fact that the evaporation rate of water is inversely proportional to pressure at constant temperature, the evaporation rate of the reactive water increases under the low pressure due to the negative pressure caused by the suction of the compressor 124, and the reactive water vaporizes without wetting excessively through the high-polymer membrane. As a consequence, the amount of water required per fixed volume (capacity) increases, with the result that the amount of humidification may be insufficient for the air supply. Therefore, a method is needed for obtaining sufficient humidification for regular power-generation.

In this embodiment, the condenser 126 for collecting water remaining in the exhaust air Ae is provided downstream from the water-permeable-type humidifier 123 on the air exhaust passage 102b. The condenser 126 comprises a water spray apparatus for supplying condensed water (collected water) to the air supply As.

The condenser 126 need only be capable of collecting water from the exhaust air Ae by condensation, there being no limitations on the aspect of the condensation. To increase the overall efficiency of the fuel cell system 120, this embodiment uses a metal receptacle having a sealed cylindrical top section and a funnel-like bottom section as the condenser main body. The exhaust air Ae pressed inside the main body rises while being rotated, thereby obtaining condensed water by the touching and striking of water particles against the inner peripheral face of the main body. The condenser 126 is provided downstream from the water-permeable-type humidifier 123. A reservoir section (not shown) for storing the condensed water is attached to the bottom section of the condenser 126. An auxiliary humidifier comprising the injector 126b is attached to the reservoir section via a communicating passage 126a, and the auxiliary water tank 126d for supplying water is attached to the top section of the condenser 126 via a communicating passage 126c.

The open/close valve 126e for water refill is provided on a communicating passage 126c which communicates the condenser 126 to the auxiliary water tank 126d, and an auxiliary humidifier comprising the injector 126b is connected between the cathode side gas passage 101a and the water-permeable-type humidifier 123 via a communicating passage 126h.

Furthermore, pressure sensors (not shown) for detecting the pressure in front of and behind the injector 126b are provided in front of and behind the injector 126b. When it has been determined that the difference between the pressure upstream from the compressor 124 and the pressure inside the condenser 126, i.e. the difference between the pressures in front of and behind the injector 126b, is lower than the pressure for achieving water injection, a pressure control apparatus comprising the pressure adjustment valve (back pressure valve) 125 applies pressure to the surface of the fluid in the reservoir section of the condenser 126. A compressor 128a and a pump (not shown) may be separately provided in order to increase the responsiveness of the pressure application. Incidentally, when the compressor 128a is provided, an air cleaner 128b is provided at an air inlet of the compressor 128a in order to clean air for pressure application.

Therefore, when the compressor 124 of the air exhaust passage 102b is activated, the suction of the compressor 124 reduces the pressure upstream from the compressor 124 and increases the pressure downstream therefrom. The water created by the reaction of hydrogen and oxygen vaporizes due to the reduced pressure obtained by the suction of the compressor 124, and is transferred downstream with the water in the exhaust air Ae exhausted from the fuel cell 101. The water is condensed by the condenser 126 and stored in the reservoir section thereof. By controlling the opening and closing of the open/close valve 126e and the difference in pressure in front of and behind the injector 126b, it is possible to supply an appropriate amount of atomized water on the cathode side gas passage 101a.

In this embodiment, to adjust the amount of the water supply, a humidity sensor T1 and a dew point sensor (not shown) for detecting the humidity and dew point of the air supply As are provided on the air supply passage 102a, which is upstream from the cathode side gas passage 101a. The humidity sensor T1 and the dew point sensor output measurement results to a controller ECU 129. The controller ECU 129 opens and closes the open/close valve 126e, and controls the injector 126b, the pressure adjustment valve (back pressure valve) 125, and/or a separately provided compressor 128a, and a pump (not shown).

Figure 27:
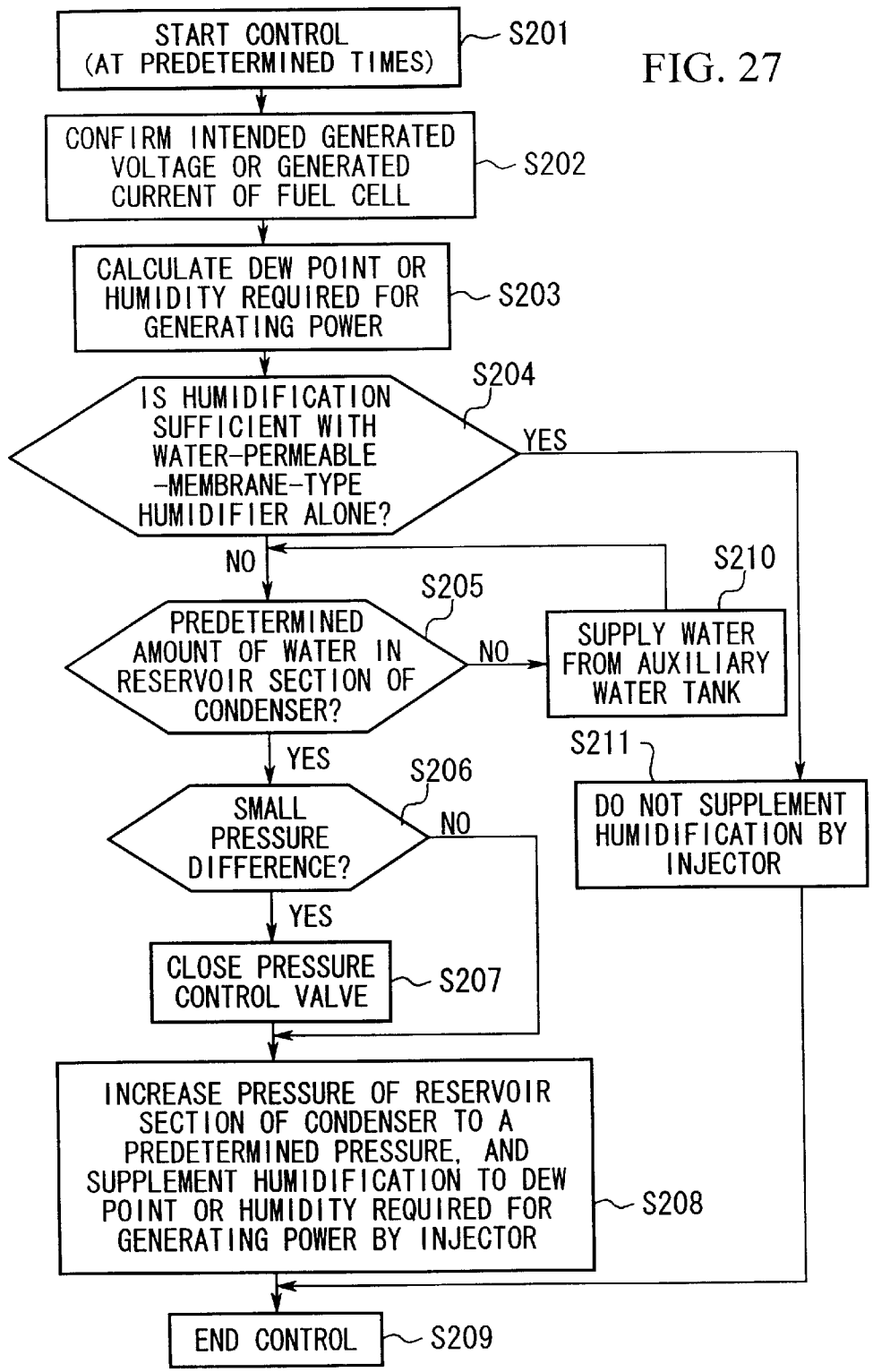
FIG. 27 is a flowchart showing an embodiment of control contents of a controller ECU in the tenth embodiment.
Figure 28:
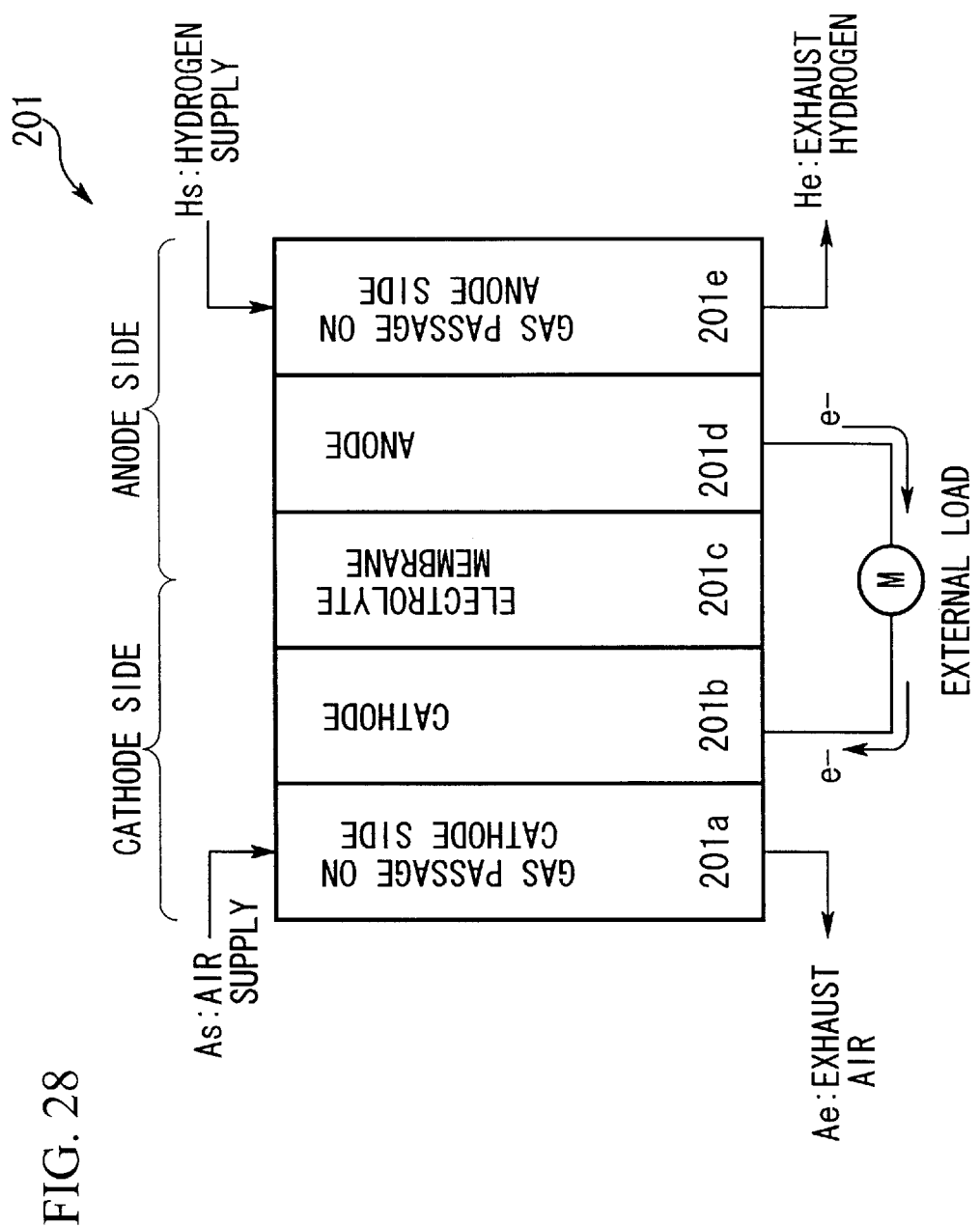
FIG. 28 is an explanatory diagram showing the constitution of a general fuel cell.

FIG. 27 shows one aspect of a control operation which is executed by the controller ECU 129 at predetermined time intervals. Incidentally, the controller ECU 129 comprises a conventional microcomputer.

The controller ECU 129 confirms the target generated voltage or the target generated current of the fuel cell 101 (S201), and calculates the dew point or humidity needed for generating power based on the target power voltage or the target power current (S202). It is determined whether the water-permeable-type humidifier 123 is capable of providing sufficient humidification, given the humidification conditions of the present operation. That is, it is determined whether humidification only by the water-permeable-type humidifier 123 will be sufficient (S204). When not sufficient (NO), it is determined whether a predetermined amount of water is stored in the reservoir section of the condenser 126, i.e. whether there is a predetermined amount of water in the condenser 126 (S205). The level of water in the reservoir section of the condenser 126 is determined by the fluid level sensor L1 shown in FIG. 26. When it has been determined in S205 that the amount of water in the reservoir section of the condenser 126 is insufficient for water injection, i.e. when the result of the determination is NO, the open/close valve 126e is opened, and water is supplied from the auxiliary water tank 126d to the condenser 126 until the fluid level sensor L1 determines that the water level of the reservoir section of the condenser 126 is sufficient for water injection (S210).

In determining (S205) whether there is a predetermined amount of water in the reservoir section of the condenser 126, when the water level of the reservoir section of the condenser 126 is sufficient for water injection, i.e. when the result of the determination is YES, the difference between the pressure upstream from the compressor 124 and the internal pressure of the condenser 126 (i.e. the difference in pressure in front of and behind the injector 126b) is determined from values obtained from pressure sensors (not shown) which are provided in front of and behind the injector 126b. Then, it is determined whether the pressure difference is lower than a pressure for enabling water injection (S206).

When it has been determined in S206 that the difference in pressure in front of and behind the injector 126b is lower than the pressure for enabling water injection, the pressure adjustment valve (back pressure valve) 125 is closed (or the degree of the present opening is reduced) (S207). The back pressure on the water injection 126b is set to the water injection pressure, and pressure is applied to the surface of the fluid in the reservoir section of the condenser 126. Water is injected upstream from the cathode side gas passage 101a, supplementing the humidification of the air supply As. In this case, humidification is supplemented until the values detected by the humidity sensor T1 or the dew point sensor reach the humidity or the dew-point corresponding to the target generated current and the target generated voltage (S208). In the determination of S206, when difference between the pressure upstream from the compressor 124 and the pressure in the condenser 126 (i.e. the difference between the pressure in front of and behind the injector 126b) is higher than the pressure for enabling water injection, the flow proceeds to step S208 and supplements the humidification of the air supply As as described above, whereby the control operation ends (S209).

In step S208, to improve the responsiveness of the water injection and the responsiveness of the humidification supplement, pressure may be applied to the fluid surface of the reservoir section of the condenser 126 by a separately provided compressor 128a and a pump (not shown) simultaneously to the closing of the pressure adjustment valve 125.

On the other hand, when it is determined (S204) that sufficient humidification can be obtained by using only the water-permeable-type humidifier 123 (i.e. that the water-permeable-type humidifier 123 can satisfy the humidification conditions demanded by present operation), the controller ECU 129 stops the application of pressure to the injector 126b and the fluid surface of the reservoir section of the condenser 126, thereby ending the auxiliary humidification by water injection (S211).

Therefore, the controller ECU 129 enables the fuel cell 101 to keep generating power with stability and to supply the target current and voltage to the load, such as a motor.

Although the explanation of this embodiment describes a case where water, which has been collected and condensed by the condenser 126, is injected immediate upstream on the cathode side gas passage 101a, water may be injected downstream on the cathode side gas passage 101a and upstream from the compressor 124, or both immediate downstream and upstream on the cathode side gas passage 101a. Of course, in this case, the injected water is supplied until the air supply As reaches the predetermined dew point or the predetermined humidity required for generating power.

Instead of using the values detected by the humidity sensor T1 and the dew point sensor, it is acceptable to activate the injector 126b, and any of the pressure adjustment valve 125 which applies pressure to the fluid surface of the reservoir section of the condenser 126, the compressor 128a, and the pump, thereby humidifying the air supply As, until values detected by a monitor CV1 for detecting voltage or current reach the target generated voltage or target generated current of the fuel cell 101.

In order to keep the water level in the reservoir section of the condenser 126 at the predetermined level at all times, the fluid level is monitored at all times by the fluid level sensor L1 and the like. When the signal output from the fluid level sensor L1 does not meet the predetermined water level, the condenser 126 is refilled with water from the auxiliary water tank 126d and the like. The condenser 126 can be refilled until there is no more water in the auxiliary water tank 126d, but, in order to protect the fuel cell system 120, the operation of the fuel cell system 120 is terminated when the output of the fluid level sensor L1 is below the predetermined water level and humidification by water injection is required.

Anti-freeze heaters (not shown), and sensors T2 and T3 for detecting the temperatures of the reservoir sections of the condenser 126 and the auxiliary water tank 126d respectively, are attached to the condenser 126 and the auxiliary water tank 126d. Based on the results detected by the sensors T2 and T3, the heaters are activated in order to prevent freezing when the temperatures of the reservoir sections of the condenser 126 and the auxiliary water tank 126d fall below temperatures near freezing.

When there is too much water in the condenser 126, a pump 126i, which is separately attached to the condenser 126, may be used to transfer the extra water to the auxiliary water tank 126d. The condenser 126 may comprise a condenser (heat exchanger) which obtains condensed water by using a heat exchanging medium.

The compressor 124 was mentioned as one example of the transfer apparatus of the air transfer passage 102, but a pump may be used instead.

This embodiment described a case applied in an air transfer system, but the humidification constitution of this embodiment (the compressor 124, the condenser 126, the auxiliary water tank 126d, the open/close valve 126e, the injector 126b, the compressor 128a, etc.) can be applied to the hydrogen transfer passage 103 in the same manner as in the air transfer system, thereby increasing the performance and reliability of the entire fuel cell system.

The control processes executed by the controller ECU 129, described using the flowchart of FIG. 27, are not limited to the system constitution of FIG. 26 according to this embodiment, and may be applied in the system of the first to ninth embodiments.

According to the abovementioned embodiments of this invention, the following effects can be obtained.

(1) In a case where the water-permeable-type humidifier cannot carry out humidification when the fuel cell starts operating with a dry hollow fiber membrane, the auxiliary humidifier which is provided separate thereto can carry out humidification. Therefore, it is possible to start generating power early.

(2) After the water-permeable-type humidifier has become capable of humidifying, humidification is switched from the auxiliary humidifier to the water-permeable-type humidifier only. Consequently, sufficient humidification can be achieved without wasteful power consumption.

(3) During normal operation of the fuel cell after start-up, when the amount of humidification by the water-permeable-type humidifier becomes insufficient due to insufficient capability thereof or the like, the auxiliary humidifier supplements the humidification, solving the problem of insufficient humidification.

(4) When collected water has been supplied upstream of the water-permeable-type humidifier, the water-permeable-type humidifier carries out humidification in the same way as during normal power-generating. When the collected water has been supplied to the gas supply side of the fuel cell, the water-permeable-type humidifier is bypassed and the gas supply is directly humidified by the auxiliary humidifier.

(5) Excess water is automatically exhausted, instead of being left in the system.

(6) When the water level in the water collecting apparatus has dropped a predetermined level or below, i.e. when the auxiliary humidifier becomes unable to humidify due to insufficient collected water, the operation of the auxiliary humidifier is stopped. Therefore, no power is wasted and the power-generating efficiency can be increased.

(7) It is possible to humidify the gas supply without allowing the collected water to freeze, even at low outside air temperatures.

(8) The antifreeze apparatus does not operate when there is no danger that the collected water will freeze. Therefore, no power is wasted and the power-generating efficiency can be increased.

As described in detail above, various modifications are permissible which do not contravene the main concept of this invention. Of course, these modifications still come under the scope of this invention.

What is claimed is:

1. A fuel cell system, comprising:
   a fuel cell which generates power by using a supply of fuel gas and oxidizing gas;
   a water-permeable-type humidifier which collects water from exhaust gas exhausted from the fuel cell, and humidifies the gas supply to the fuel cell; and
   an auxiliary humidifier which is provided with a vapor/liquid separator which separates the water from the exhaust gas that could not be collected by the water-permeable-type humidifier, a collected water storage tank which stores the separated collected water, and an injector which injects the collected water, stored in the collected water storage tank, to the gas supply or the exhaust gas.

2. The fuel cell system according to claim 1, wherein the auxiliary humidifier supplies the collected water to the fuel cell when the amount of humidification obtained by the water-permeable-type humidifier is insufficient for humidifying the fuel cell.

3. The fuel cell system according to claim 1, wherein the auxiliary humidifier supplies the collected water for a predetermined period of time at the start-up of the fuel cell.

4. The fuel cell system according to claim 1, wherein the auxiliary humidifier supplies the collected water based on the difference between the amount of humidification required by the fuel cell and the amount of humidification which can be achieved by the water-permeable-type humidifier.

5. The fuel cell system according to claim 1, wherein the auxiliary humidifier is provided with a water level detector which detects the water level of collected water stored in the collected water storage tank, and exhausts the collected water from the collected water storage tank when the water level exceeds a predetermined level.

6. The fuel cell system according to claim 1, wherein the auxiliary humidifier further comprises an anti-freezing apparatus which prevents the collected water from freezing.

7. The fuel cell system according to claim 1, wherein the water-permeable-type humidifier collects water in the exhaust gas by means of a water condensation membrane or an ion-hydration-type membrane.

8. The fuel cell system according to claim 1, wherein the auxiliary humidifier humidifies the gas supply to a fuel electrode of the fuel cell after collecting part of water which is created on an air electrode side of the fuel cell.

9. A fuel cell system comprising:
a fuel cell which generates power by using a supply of fuel gas and oxidizing gas;
a water-permeable-type humidifier which collects water from exhaust gas exhausted from the fuel cell, and humidifies the gas supply to the fuel cell; and
an auxiliary humidifier which collects water that could not be collected by the water-permeable-type humidifier, and humidifies the gas supply to the fuel cell.

10. The fuel cell system according to claim 9, wherein the auxiliary humidifier comprises a vapor/liquid separator which separates the water from the exhaust gas, a collected water storage tank which stores the separated collected water, and an injector which injects the collected water, stored in the collected water storage tank, to the gas supply or the exhaust gas.

11. The fuel cell system according to claim 10 wherein the auxiliary humidifier is provided with a water level detector which detects the water level of collected water stored in the collected water storage tank, and exhausts the collected water from the collected water storage tank when the water level exceeds a predetermined level.

12. The fuel cell system according to claim 15, wherein the water-permeable-type humidifier is integrated with the vapor/liquid separator.

13. The fuel cell system according to claim 10, further comprising:
a humidifying water auxiliary tank which stores water; and
a transfer unit which transfers the collected water stored in the collected water storage tank to the humidifying water auxiliary tank when the level of the collected water stored in the collected water storage tank exceeds an upper limit, and which transfers the water stored in the humidifying water auxiliary tank to the collected water storage tank when the level of the collected water stored in the collected water storage tank drops below a predetermined level.

14. The fuel cell system according to claim 9, wherein the auxiliary humidifier supplies the collected water to the fuel cell when the amount of humidification obtained by the water-permeable-type humidifier is insufficient for humidifying the fuel cell.

15. The fuel cell system according to claim 9, wherein the auxiliary humidifier supplies the collected water immediately after the start-up of the fuel cell.

16. The fuel cell system according to claim 15, wherein the auxiliary humidifier supplies the collected water until a predetermined time elapses after the start-up of the fuel cell, until the voltage generated by the fuel cell exceeds a predetermined voltage, until an amount of humidification exceeds a predetermined amount, or until the dew point of gas supplied to the fuel cell exceeds a predetermined value.

17. The fuel cell system according to claim 9, wherein the auxiliary humidifier supplies the collected water based on the difference between the amount of humidification required by the fuel cell and the amount of humidification which can be achieved by the water-permeable-type humidifier.

18. The fuel cell system according to claim 9, wherein the auxiliary humidifier further comprises an anti-freezing apparatus which prevents the collected water from freezing.

19. The fuel cell system according to claim 9, wherein the water-permeable-type humidifier collects water in the exhaust gas by means of a water condensation membrane or an ion-hydration-type membrane.

20. The fuel cell system according to claim 9, wherein the water-permeable-type humidifier is provided at least on an air electrode side of the fuel cell; and
the auxiliary humidifier collects part of the water created on the air electrode side which could not be collected by the water-permeable-type humidifier, and humidifies the gas supply to a fuel electrode of the fuel cell.

21. A fuel cell system comprising:
a fuel cell which generates power by using a supply of fuel gas and oxidizing gas;
a water-permeable-type humidifier which collects water from exhaust gas exhausted from an air electrode of the fuel cell, and humidifies the gas supply to the air electrode of the fuel cell; and
an auxiliary humidifier which collects water that could not be collected by the water-permeable-type humidifier, and humidifies the gas supply to a fuel electrode of the fuel cell.

22. The fuel cell system according to claim 21, wherein the auxiliary humidifier comprises a vapor/liquid separator which separates the water from the exhaust gas, a collected water storage tank which stores the separated collected water, and an injector which injects the collected water, stored in the collected water storage tank, to the gas supply or the exhaust gas.

* * * * *